(12) United States Patent
Kraisser et al.

(10) Patent No.: US 6,701,299 B2
(45) Date of Patent: Mar. 2, 2004

(54) REAL-TIME DELIVERY FEASIBILITY ANALYSIS SYSTEMS AND METHODS

(75) Inventors: Clifton Brian Kraisser, Ellicott City, MD (US); Vincent Cucchiara, York, PA (US); Stephen Patrick Simon, Sparks, MD (US); Ronald Shin-Yung Taur, Timonium, MD (US); Charles Virden, Ellicott City, MD (US)

(73) Assignee: United Parcel Service of America, Inc., Atlanta, GA (US)

( * ) Notice: Subject to any disclaimer, the term of this patent is extended or adjusted under 35 U.S.C. 154(b) by 79 days.

(21) Appl. No.: 09/811,375

(22) Filed: Mar. 16, 2001

(65) Prior Publication Data

US 2002/147654 A1 Oct. 10, 2002

(51) Int. Cl.[7] .............................................. G06F 17/60
(52) U.S. Cl. .............................. 705/8; 705/26; 700/100
(58) Field of Search ............................ 705/8, 9, 26, 27; 701/117; 700/100

(56) References Cited

U.S. PATENT DOCUMENTS

| | | | |
|---|---|---|---|
| 5,168,451 A | * 12/1992 | Bolger | ........................ 340/994 |
| 5,310,997 A | 5/1994 | Roach et al. | |
| 5,541,848 A | 7/1996 | McCormack et al. | |
| 5,615,121 A | 3/1997 | Babayev et al. | |
| 5,692,125 A | 11/1997 | Schloss et al. | |
| 5,809,479 A | 9/1998 | Martin et al. | |
| 5,922,040 A | 7/1999 | Prabhakaran | |
| 5,960,408 A | 9/1999 | Martin et al. | |
| 5,970,466 A | 10/1999 | Detjen et al. | |
| 6,029,140 A | 2/2000 | Martin et al. | |
| 6,073,110 A | 6/2000 | Rhodes et al. | |
| 6,085,170 A | 7/2000 | Tsukuda | |
| 6,088,648 A | 7/2000 | Shah et al. | |
| 6,240,362 B1 | 5/2001 | Gaspard, II | |

FOREIGN PATENT DOCUMENTS

| | | | |
|---|---|---|---|
| JP | 8-106493 | * | 4/1996 |
| JP | 2000-20386 | * | 1/2000 |
| WO | WO 01/72109 | | 10/2001 |

OTHER PUBLICATIONS

Fracassini, Camillo, "Shopping Revolution Delivers The Goods", Scotsman, p. 22, Sep. 8, 1999.*

Timothy P. Henderson, "*Scheduling Software Helps Webvan Meeting 30–Minute Delivery Window*", www.stores.org., pp. 1–2; Jul. 2000.

The Descartes Systems Group, Inc.; www.descartes.com, "*Descartes*", Apr. 2000.

The Descartes Systems Group, Inc.; www.descartes.com, "*DeliveryNets*" (this publication was printed from the World Wide Web around Jan. 2001.

(List continued on next page.)

*Primary Examiner*—F. J. Bartuska
(74) *Attorney, Agent, or Firm*—Alston & Bird LLP

(57) ABSTRACT

Systems and methods for scheduling deliveries, in real time, to be made within one or more delivery time windows. For each requested delivery, the system dynamically determines whether to offer each time delivery window to the customer requesting the delivery based on whether: (1) it would be possible to complete, within the time window, both the requested delivery and all deliveries that were already scheduled to be made within the time window; and (2) it makes business sense to make the delivery within the particular time window. In determining whether it would make business sense to make the delivery within a particular time window, the system considers the cost of making the delivery, various attributes of the customer requesting the delivery, and the percentage of the delivery capacity associated with the delivery wave that has been reserved for previously scheduled deliveries.

79 Claims, 19 Drawing Sheets

OTHER PUBLICATIONS

The Descartes Systems Group, Inc.; www.decartes.com, "*e–Frame, A Framework for Building DeliveryNets*" (this publication was printed from the World Wide Web around Jan. 2001).

The Descartes Systems Group, Inc.; www.decartes.com, "*e–Scheduler, Web–Based Self–Scheduling for Delivery*" (this publication was printed from the World Wide Web around Jan. 2001).

The Descartes Systems Group, Inc.; www.decartes.com, "*In the Driver's Seat, Mobile Technology Improves Route Delivery Efficiency and Saves Big Bucks for Multi–Marques*", Baking & Snack Magazine, Apr. 1988.

The Descartes Systems Group, Inc.; www.decartes.com, "*Mobile Accounting System Keeps Deliveries Fresh*", Food Logistics, Apr. 15, 1999.

The Descartes Systems Group, Inc.; www.decartes.com/solutions/dnet home3.html, "*E–Commerce—Can you Deliver? E–Fulfillment Solutions*"; pp 1–2 and pp. 1–4, Mar. 20, 2000.

http://quicken.excite.com/investments/news/story/bw/ . . . /a0322.htm&symbol=DSG, "*Decartes Releases Customer–Centric Web Scheduling Solution for Home Delivery and Consumer Direct Operations*" Jan. 18, 2000.

*Computer Based Truck Dispatch Works Wonders in Hunter Valley*, Australian Mining (Australia), P. Carter, pp. 42–46, Oct. 1990.

http://www.siam.org/siamnews/mtc/mtc694.htm; *Airline Ties Profitability Yield to Management*; P. Davis, SIAM News, vol. 27, No. 5, pp. 1–6, May/Jun. 1994.

*One Vendor, One Solution—Businesses Turn to ERP to Help Simplify Their Supply Chains and Avoid Integration Hassles*, Information Week, p. 108, Nov. 18, 1999.

*Transportation Scheduling System Based on Evolution Algorithm and Super Parallel Computer*; 'Steps Forward': $2^{nd}$ World Congress on Intelligent Transport Systems; Y. Hamaguchi, et al. Yokohoma, Japan, Nov. 1995, vol. 4, pp. 2027–2030.

\* cited by examiner

REAL-TIME DELIVERY FEASIBILITY ANALYSIS SYSTEMS AND METHODS

FIELD OF THE INVENTION

This patent relates generally to delivery scheduling systems, and more particularly to systems for scheduling deliveries to be made within specified time windows.

BACKGROUND OF THE INVENTION

Distributors often use computer systems to schedule deliveries of goods to their various customers. In the past, stand-alone computer systems located on-site at a distributor's place of business were used for this purpose. To schedule a delivery, a customer would call the distributor on the phone and verbally request a desired day and time range for delivery. Commonly, these time ranges would be relatively broad. For example, a customer might request that the delivery be made sometime between 8:00 am and 12:00 pm on a particular day. After receiving the order, the distributor would inform the customer that the distributor would call the customer back at a later time (usually on the next business day) to confirm the order.

At the end of each business day, all of the requested orders would be entered into a delivery-scheduling program that was executed on a stand-alone computer system. This computer system would then execute a batch scheduling program to generate a delivery schedule for all of the day's orders. In assembling the delivery schedule, the program would schedule the various deliveries in a way that minimized the time and expense required to complete the deliveries.

After a customer's requested delivery had been scheduled, the distributor would typically inform the customer by telephone as to generally when the delivery would be made. For example, the distributor might inform the customer that the delivery would arrive between 9:00 am and 1:00 pm on a particular day.

Because prior art routing and scheduling programs were written to maximize delivery efficiency, the programs often scheduled individual deliveries to be made outside of their requested delivery time-windows or on days other than the requested delivery day. This was generally not problematic because such deliveries were usually made to retailers that were commonly staffed to conduct business (and receive deliveries) during normal business hours throughout the business week. Thus, it was generally not critical that a delivery be made within the requested time period or on a particular day. For example, to a retailer that was fully staffed on weekdays from 8:00 am–5:00 pm from Monday through Friday, it was usually not a great inconvenience if a delivery were made between 1:00 pm and 5:00 pm on a Wednesday, rather than between 8:00 am and 12:00 pm on a Tuesday, as requested. Either way, an employee would be present to accept the delivery.

With the increased popularity of the Internet, businesses, such as on-line grocery delivery services, have begun delivering directly to individual consumers. Because such individual consumers have jobs and other commitments that make it difficult for them to wait at home for extended periods of time to receive a delivery, it is essential that distributors have the ability to commit to making a delivery within a narrow time window and to be able to reliably deliver within the promised time window. It is further desirable to be able to instantly confirm that the delivery will be made within a certain time window. Without this convenience and dependability, many customers will not use on-line delivery services. Instead, these customers will simply drive or walk to a retailer to purchase and pick up their needed goods in person.

Improved versions of traditional routing and scheduling software allow customers to schedule deliveries in real time within relatively narrow time windows. Such software uses a "bucket method" to schedule the deliveries. When configuring this software, a distributor specifies a predetermined number of deliveries that may be scheduled for each of several delivery time windows on a particular day. As a result, each particular time window is made available to customers until all of the deliveries scheduled for that particular time window have been reserved by customers. The time window is then "closed" to further deliveries.

Thus, for example, a distributor might specify that five deliveries within a designated area may be scheduled for a 8:00 am–9:00 am, March 31 time window, and that a single truck will be used to make all of these deliveries. In this example, this delivery time window would be made available to all customers until five deliveries had been scheduled to be made within the time window. After five deliveries had been scheduled to be made within the time window, the program would indicate to subsequent customers that the time window was "closed" and, therefore, unavailable.

Such software is advantageous in that it allows customers to schedule deliveries in real time, and within relatively narrow time windows. However, such software does not promote cost-efficient delivery scheduling. For example, in the above example, if the first four deliveries to be made within the 8:00 am–9:00 am, March 31 time window were scheduled to be made within a half mile of each other, and if the fifth delivery were scheduled to be made 15 miles away from any of the first four deliveries, the distributor might actually lose money making the fifth delivery. This is because the cost associated with driving fifteen miles out of the way to make the fifth delivery might be greater than the profit made from the delivery.

Furthermore, there might be situations in which a bucket-type delivery scheduling system would not be able to complete all of the deliveries requested for a particular time window. For example, in the example above, if each of the five deliveries that were scheduled to be made within the 8:00 am–9:00 am, March 31 time window were scheduled to be made to locations that were 15 minutes apart from each of the other delivery locations, the travel time between the 5 different destinations would be 75 minutes. Thus, it would be impossible for a single driver to complete all of the deliveries between 8:00 am and 9:00 am, as promised.

Thus, there is a need in the art for an improved delivery scheduling system that only schedules deliveries within a particular time window if: (1) it is possible to make all scheduled deliveries within the time window; and (2) it makes business sense to make each delivery within the time window.

SUMMARY OF THE INVENTION

The present invention seeks to provide an improved delivery scheduling system that only schedules deliveries within a particular time window if: (1) it is possible to make all scheduled deliveries within the time window; and (2) it makes business sense to make each delivery within the time window. The present invention accomplishes this by providing a system and method for: (1) identifying a time window in which a requested delivery may be made to a customer; (2) determining a cost of delivery that includes the cost of making the requested delivery to the customer within the time window; (3) comparing the cost of delivery with a threshold cost; and (4) responsive to the cost of delivery being less than the threshold cost, indicating that the time window is available for the delivery. Furthermore, the system preferably displays the time window to the customer in response to the cost of delivery being less than the threshold cost.

In a preferred embodiment of the invention, the system and method are configured for, responsive to the cost of delivery being equal to the threshold cost, indicating that the time window is not available for the delivery. Preferably, the system and method are also configured for, responsive to the delivery cost being greater than the threshold cost, both indicating that the time window is not available for the delivery and withholding the time window from display to the customer. In this preferred embodiment of the invention, the system and method are configured for receiving the threshold cost from a user.

In a further preferred embodiment of the invention, the time window is associated with a delivery vehicle that is already scheduled to make at least one confirmed delivery within the time widow, and the step of identifying a time window comprises the step of determining whether the delivery vehicle can make both the confirmed delivery and the requested delivery within the time window. The step of identifying the time window also preferably includes the step of determining whether the delivery capacity of the delivery vehicle would be exceeded by the requested delivery.

Preferably, the cost of delivery referenced above includes the labor costs and transportation costs associated with the delivery, and may also include the vehicle preparation costs, and vehicle loading costs associated with the delivery. The system and method are preferably configured for executing the steps described above for a plurality of time windows.

In another preferred embodiment of the invention, the step of displaying the time window to the customer comprises displaying the time window to the customer for a predetermined period of time, and the system and method are also configured for executing the steps of: (1) determining an updated cost of delivery, the updated cost of delivery comprising the cost of making the delivery to the customer within the time window; (2) comparing the updated cost of delivery with the threshold cost; and (3) displaying the time window to the customer if the updated cost of delivery is less than the threshold cost. In this embodiment of the invention, the system and method may further be configured for withholding the time window from display to the customer if the updated cost of delivery is greater than the threshold cost or if the updated cost of delivery is equal to the threshold cost.

Another preferred embodiment of the invention comprises a system and method for performing the steps of: (1) identifying a time window in which a delivery may be made to a customer, the time window being associated with a delivery wave having a delivery wave capacity; (2) comparing a portion of the delivery wave delivery capacity that has been allocated to deliveries with a threshold value; (3) responsive to the portion of the delivery wave delivery capacity that has been allocated to deliveries being greater than the threshold value, performing the steps of: (a) determining a cost of delivery that includes the cost of making the delivery to the customer within the time window; (b) comparing the cost of delivery with a threshold cost; and (c) responsive to the cost of delivery being less than the threshold cost, indicating that the time window is available for the delivery. In this embodiment of the invention, the system and method are preferably configured for, responsive to the cost of delivery being less than the threshold cost, displaying the time window to the customer. Furthermore, in this embodiment of the invention, the system and method are also preferably configured for, in response to the cost of delivery being equal to the threshold cost, indicating that the time window is not available for the delivery.

A further preferred embodiment of the invention comprises a system and method for performing the steps of: (1) identifying a time window in which a delivery may be made to a customer; (2) identifying a customer classification associated with the customer; (3) determining a cost of delivery, the cost of delivery comprising a cost of making the delivery to the customer within the time window; (4) comparing the cost of delivery with a first threshold cost if the order classification corresponds to a first customer classification; (5) comparing the cost of delivery with a second threshold cost if the order classification corresponds to a second customer classification; and (6) indicating that the time window is available for the delivery if either: (a) the cost of delivery is greater than the first threshold cost, and the customer classification corresponds to the first customer classification; or (b) the cost of delivery is greater than the second threshold cost, and the order classification corresponds to the second customer classification. In this embodiment of the invention, the customer classification may correspond to either the size of an order placed by the customer, the customer's financial characteristics, or the customer's order history.

An additional embodiment of the invention includes a computer-readable medium that includes computer-executable instructions for executing the various steps that the systems and methods described above are configured to perform.

A further embodiment of the invention comprises a method of determining whether to offer to make a requested delivery within a particular delivery time window, the method comprising the steps of: (1) determining a cost factor associated with making the requested delivery within a particular delivery time window; (2) determining a customer factor associated with a customer requesting the requested delivery; and (3) using both the cost factor and the customer factor to determine whether to offer to make the requested delivery within the particular delivery time window. The step of using both the cost factor and the customer factor preferably includes the steps of: (1) identifying a threshold "display window" value; (2) combining the cost factor and the customer factor to derive a combined delivery factor; and (3) in response to the combined delivery factor being greater than the "display window" value, determining to offer to make the requested delivery within the particular delivery time window. This embodiment of the invention preferably includes the step of, in response to the combined delivery factor being less than the "display window" value, determining to not offer to make the requested delivery within the particular delivery time window.

Alternatively, the step of using both the cost factor and the customer factor may include the steps of: (1) identifying a threshold "display window" value; (2) combining the cost factor and the customer factor to derive a combined delivery factor; and (3) in response to the combined delivery factor being less than the "display window" value, displaying the particular delivery time window. This embodiment of the invention preferably includes the step of, in response to the combined delivery factor being greater than the "display window" value, determining to not offer to make the requested delivery within the particular delivery time window. In a preferred embodiment of the invention, the step of combining the cost factor and the customer factor comprises adding the cost factor and the customer factor.

BRIEF DESCRIPTION OF THE DRAWINGS

Figure 1:
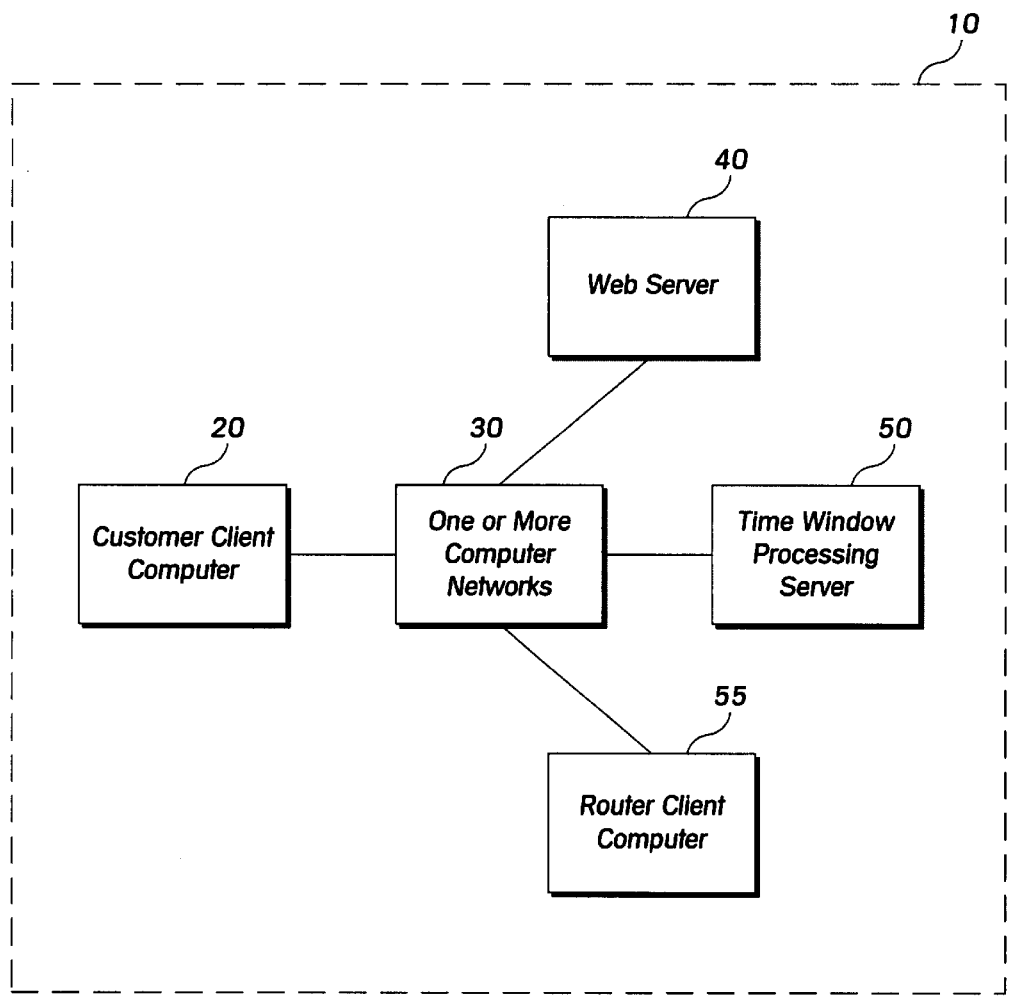

Having thus described the invention in general terms, reference will now be made to the accompanying drawings, which are not necessarily drawn to scale, and wherein:

FIG. 1 is a first block diagram of a system according to one embodiment of the present invention.

Figure 2:
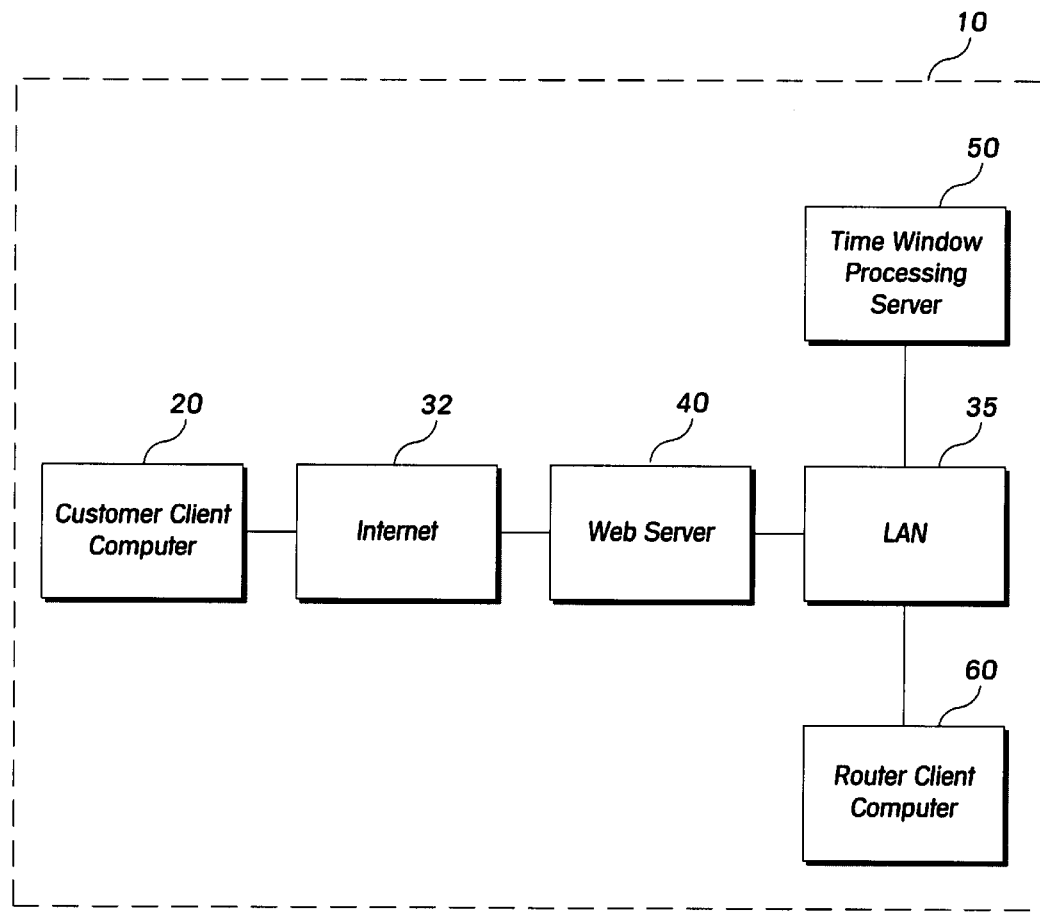

FIG. 2 is a second block diagram of a system according to a preferred embodiment of the present invention.

Figure 3:
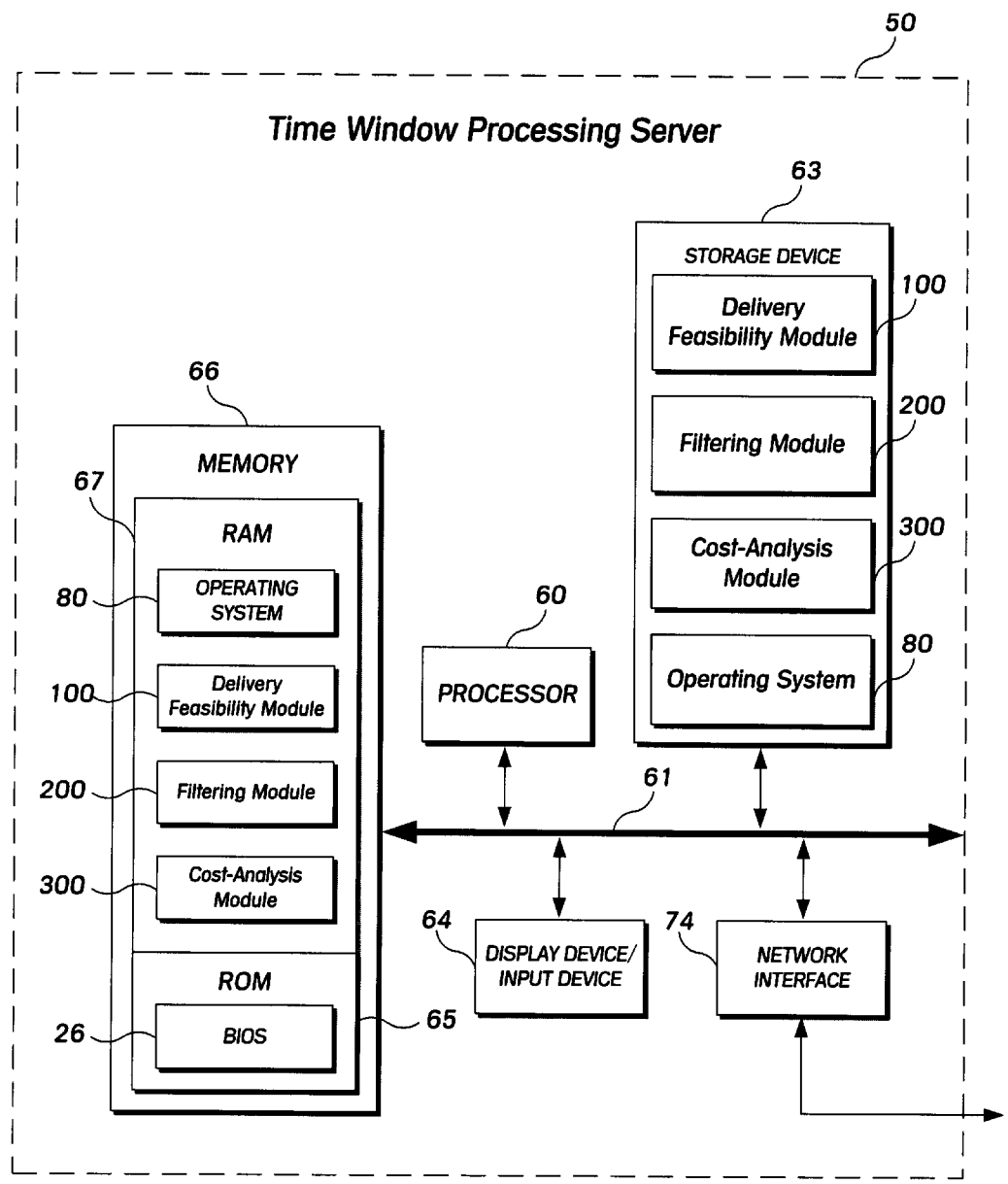
Figure 4A:
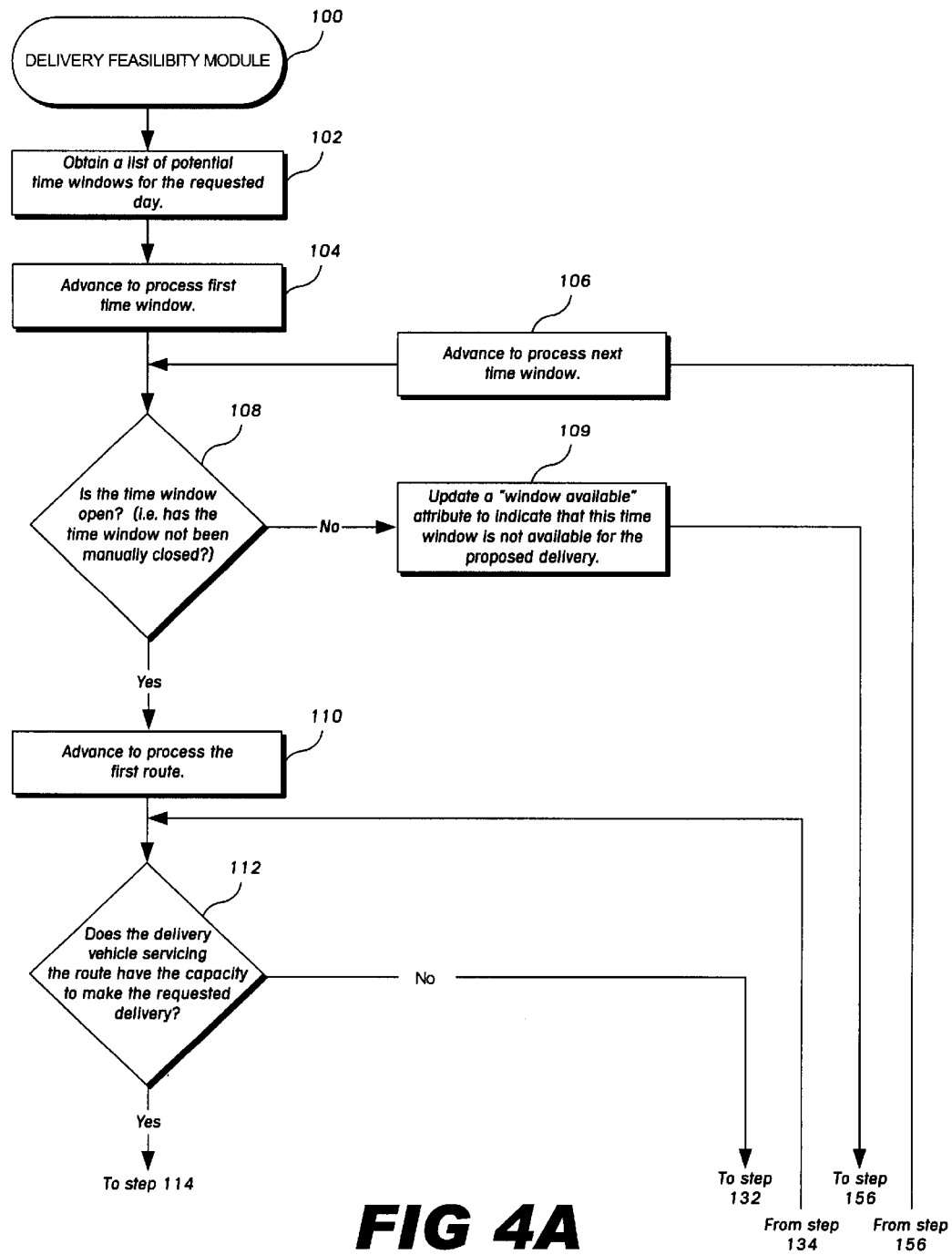
Figure 4B:
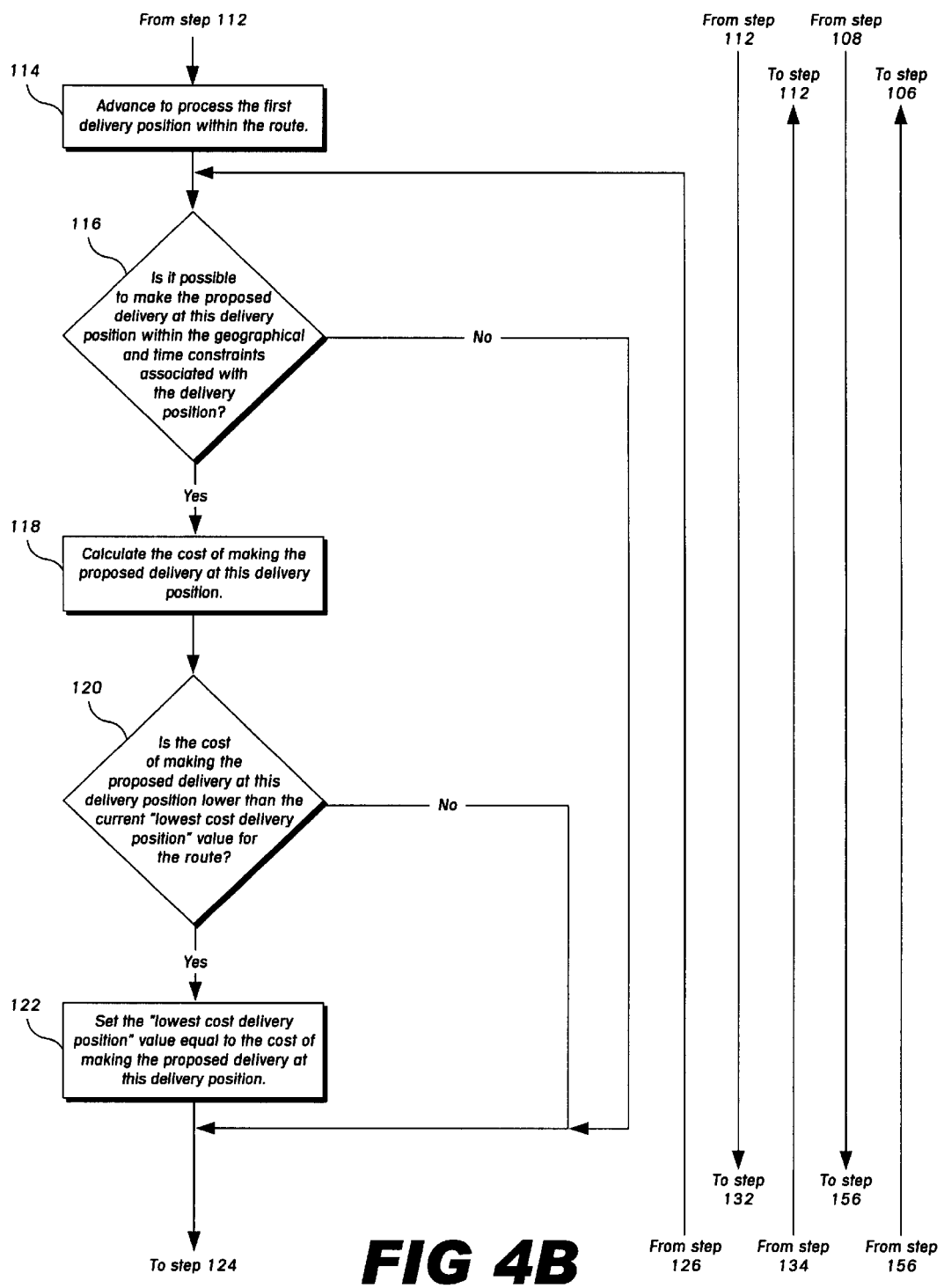
Figure 4C:
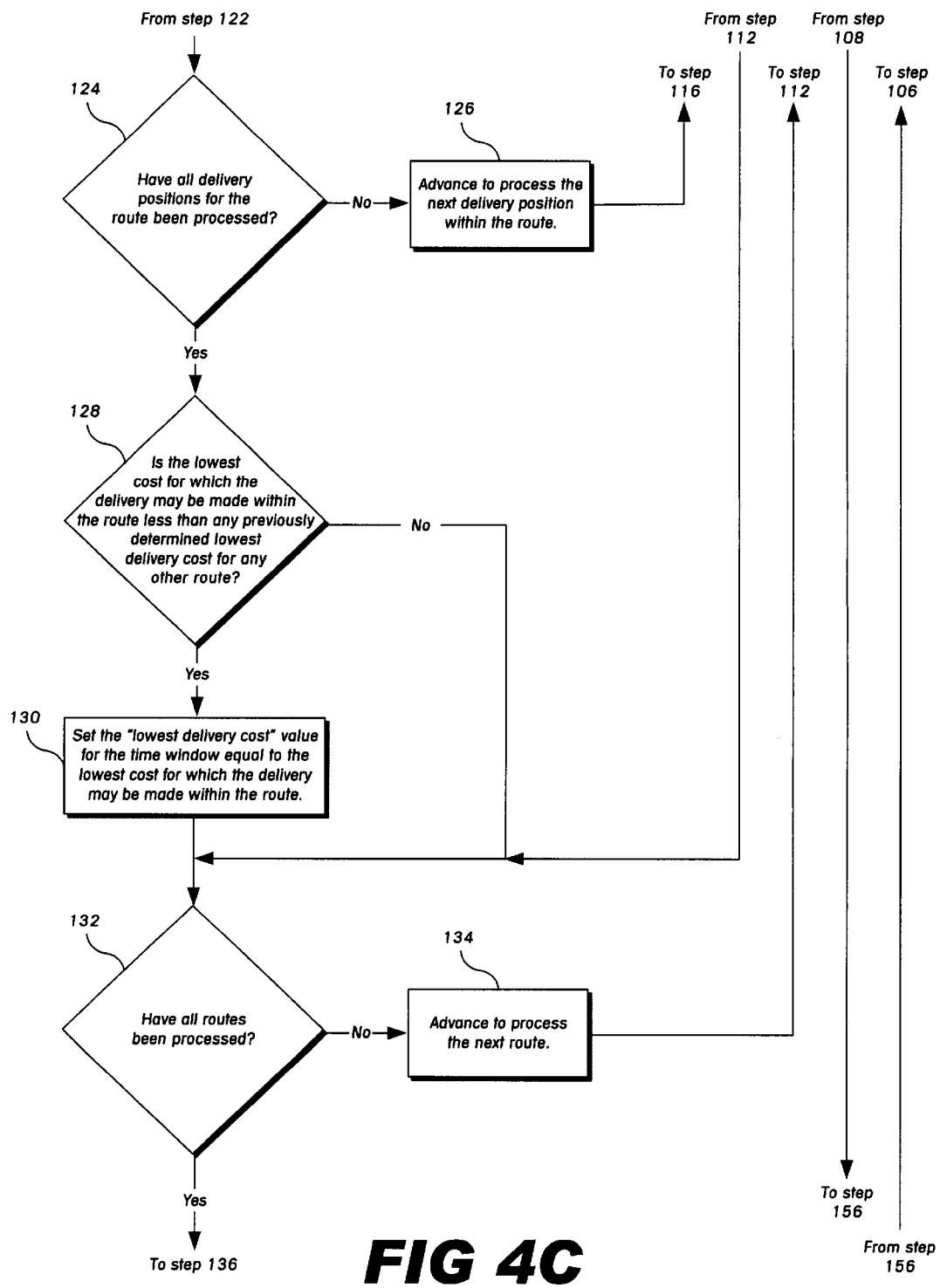
Figure 4D:
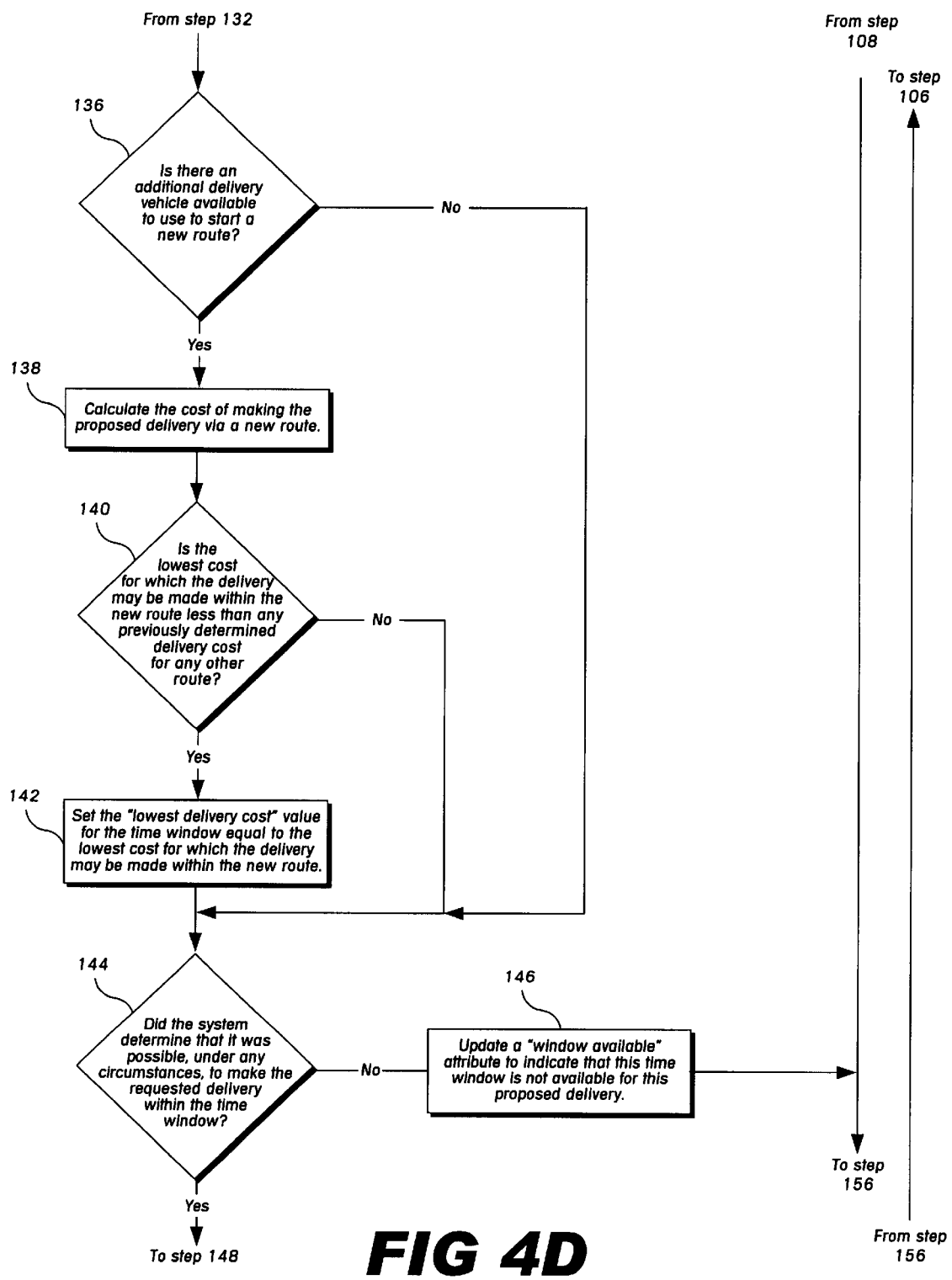
Figure 4E:
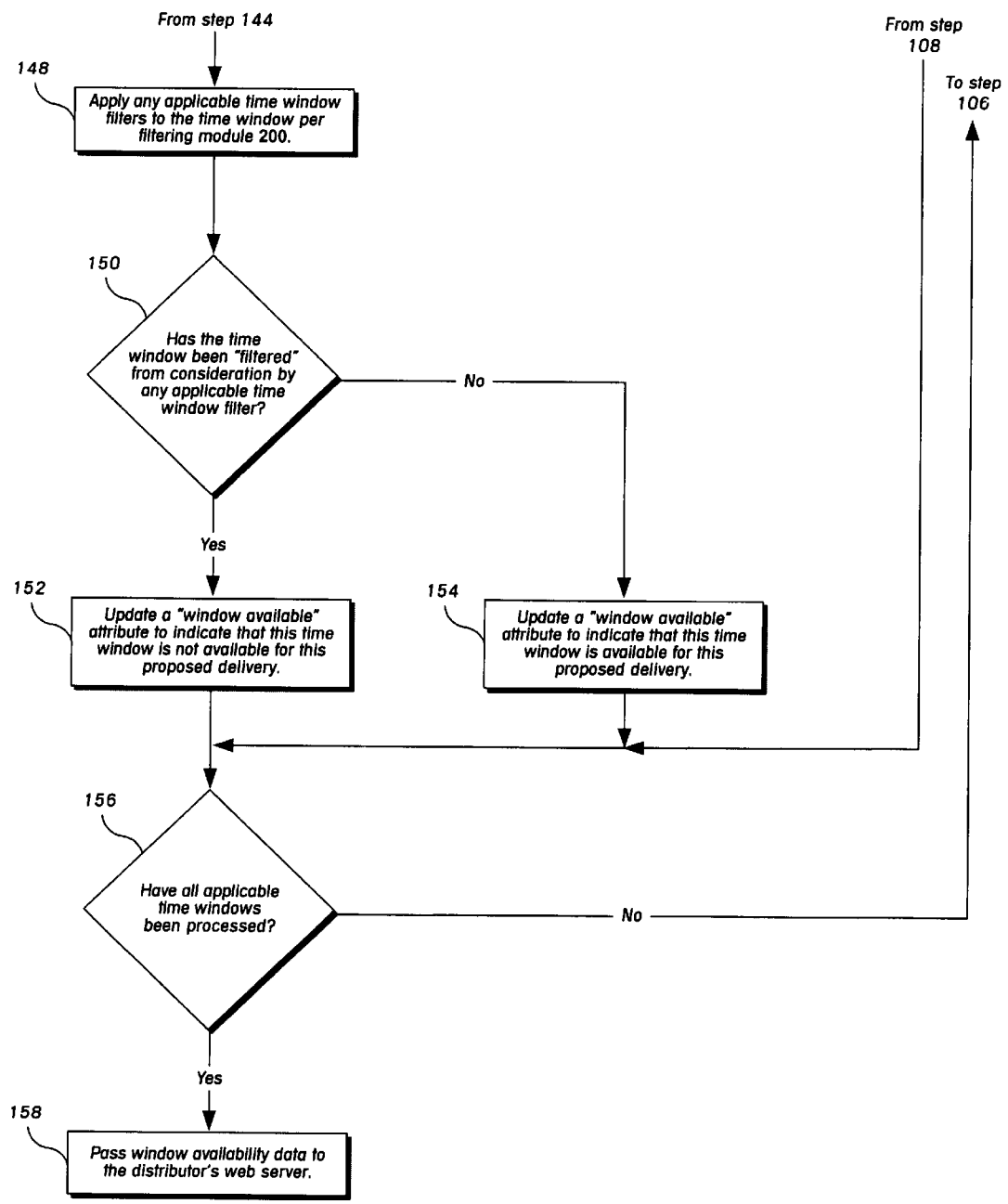

FIG. 3 is a block diagram of a Time Window Processing Server according to a preferred embodiment of the invention.

FIGS. 4A through 4E depict a flowchart that generally illustrates a delivery feasibility module according to the current invention.

Figure 5A:
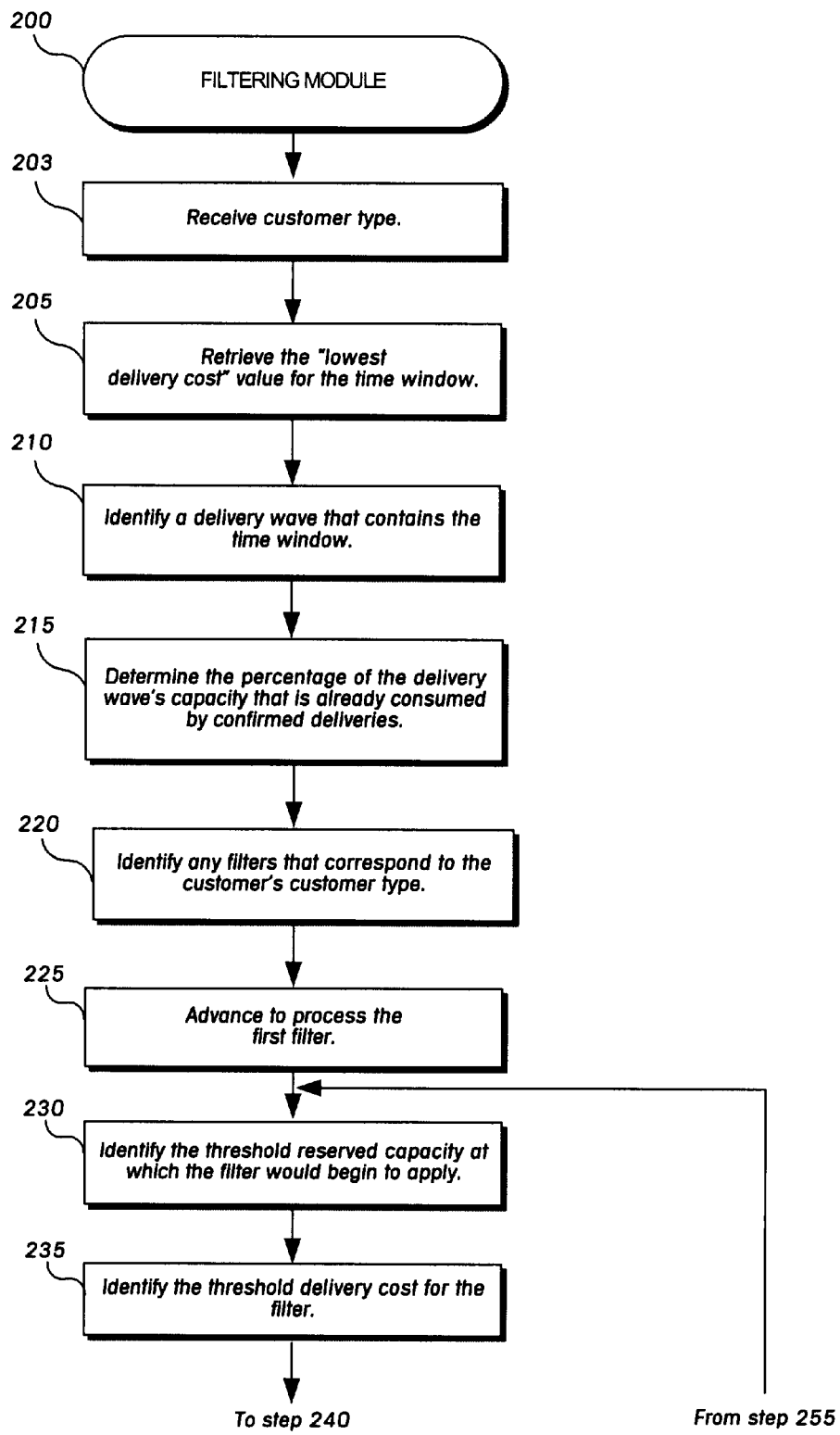
Figure 5B:
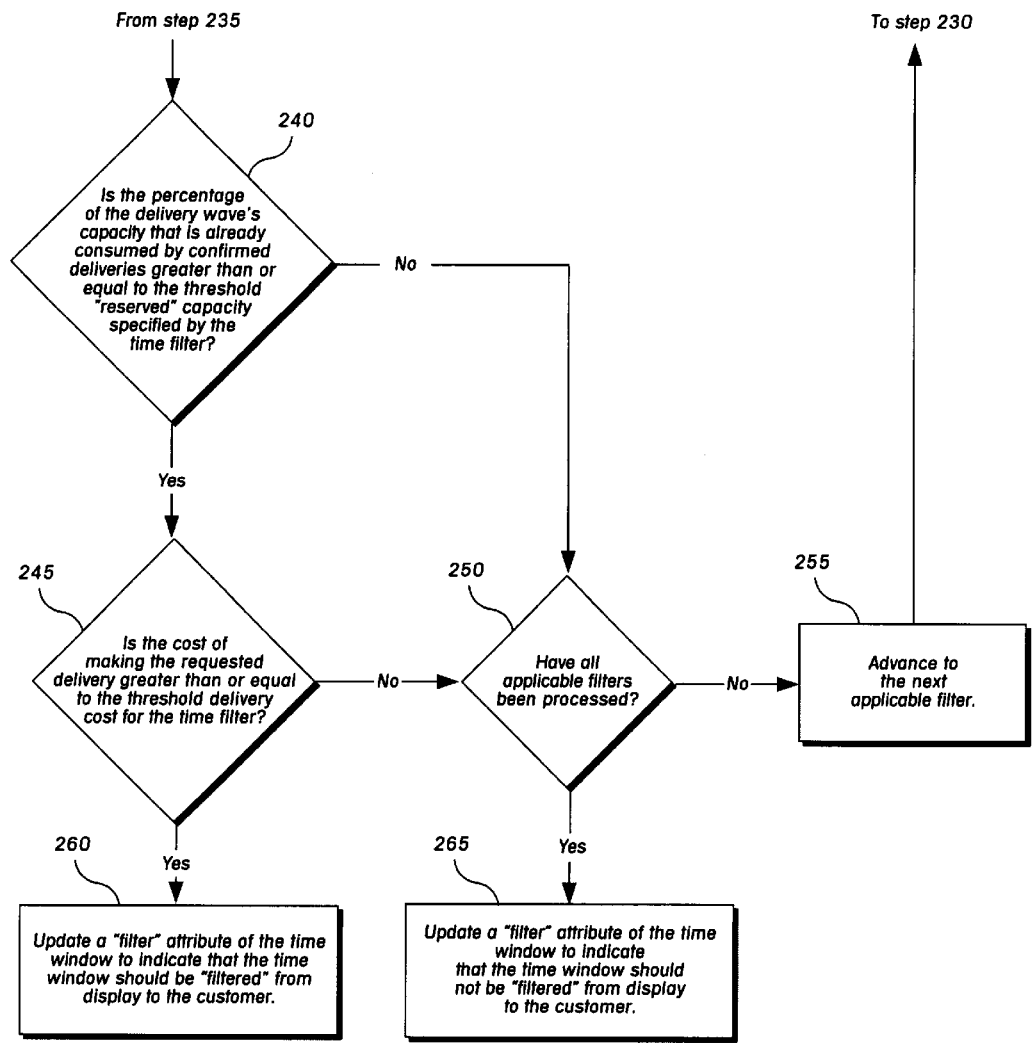

FIGS. 5A and 5B depict a flowchart that generally illustrates a filtering module according to the current invention.

Figure 6A:
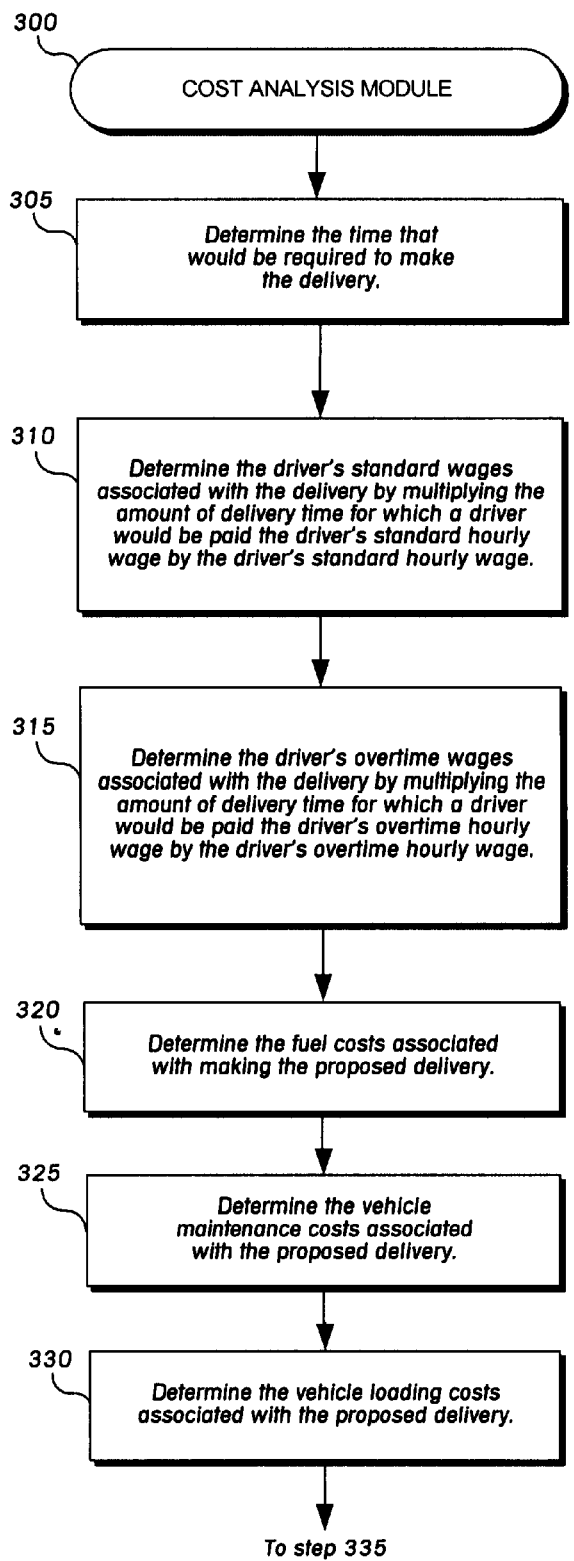
Figure 6B:
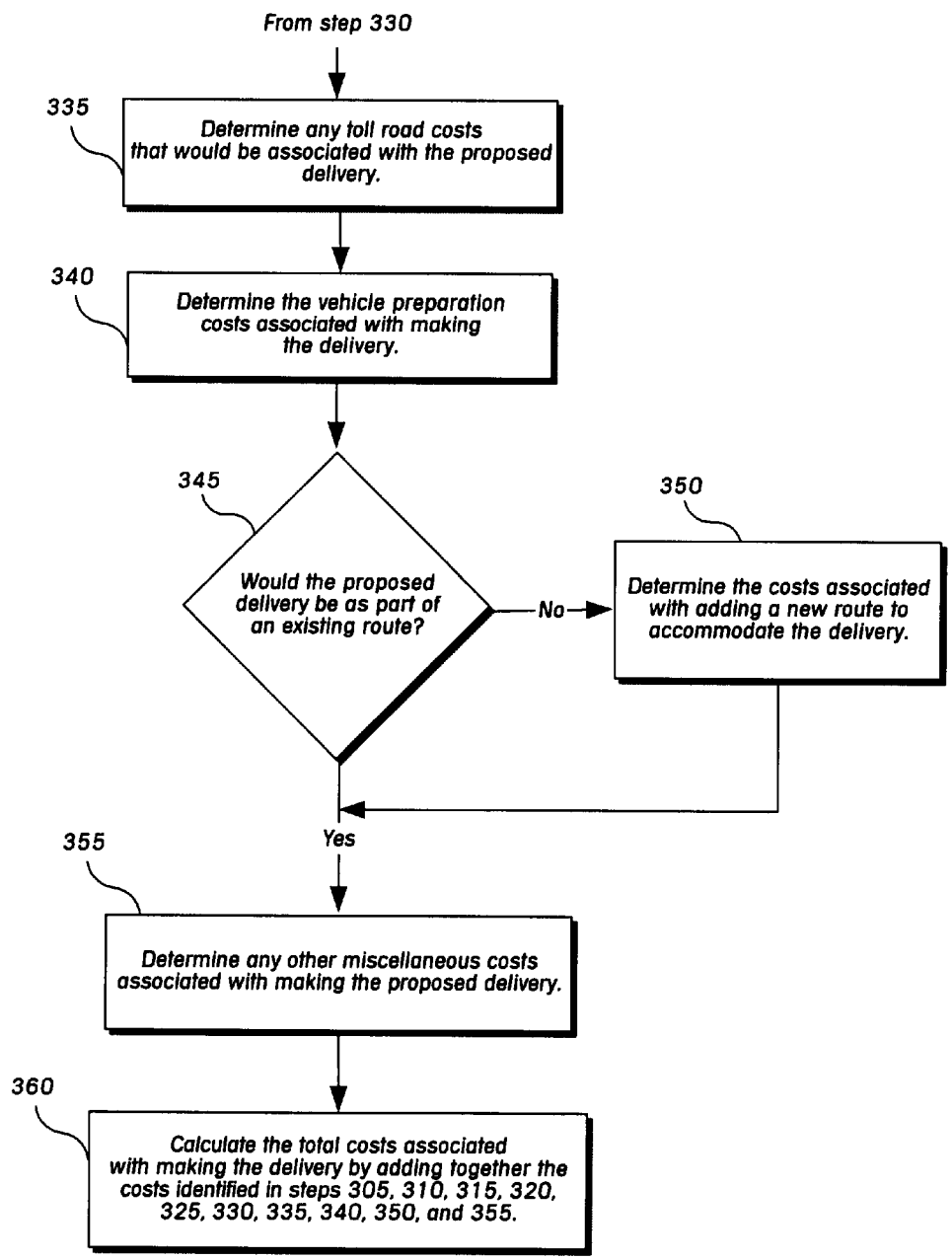

FIGS. 6A and 6B depict a flowchart that generally illustrates a cost analysis module according to the current invention.

Figure 7:
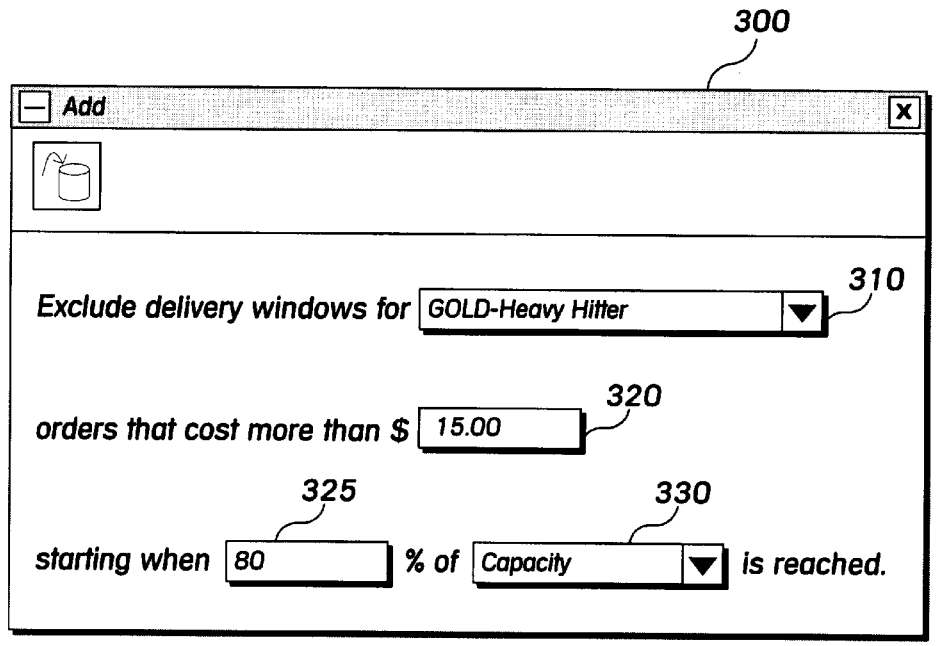

FIG. 7 is a graphic illustration of an "Add Filter" window according to the current invention.

Figure 8:
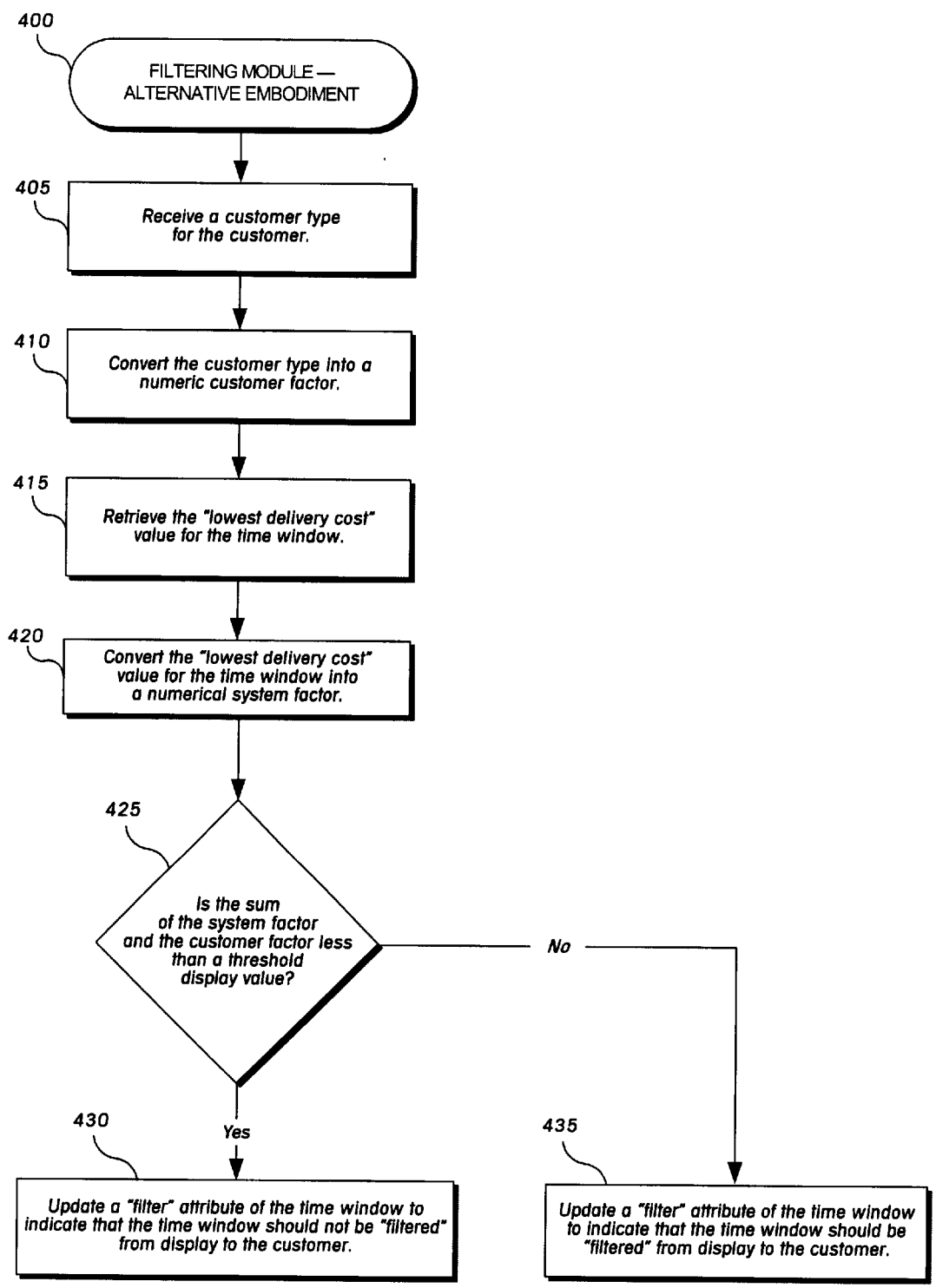

FIG. 8 depicts a flowchart that generally illustrates a filtering module according to an alternative embodiment of the current invention.

Figure 9:
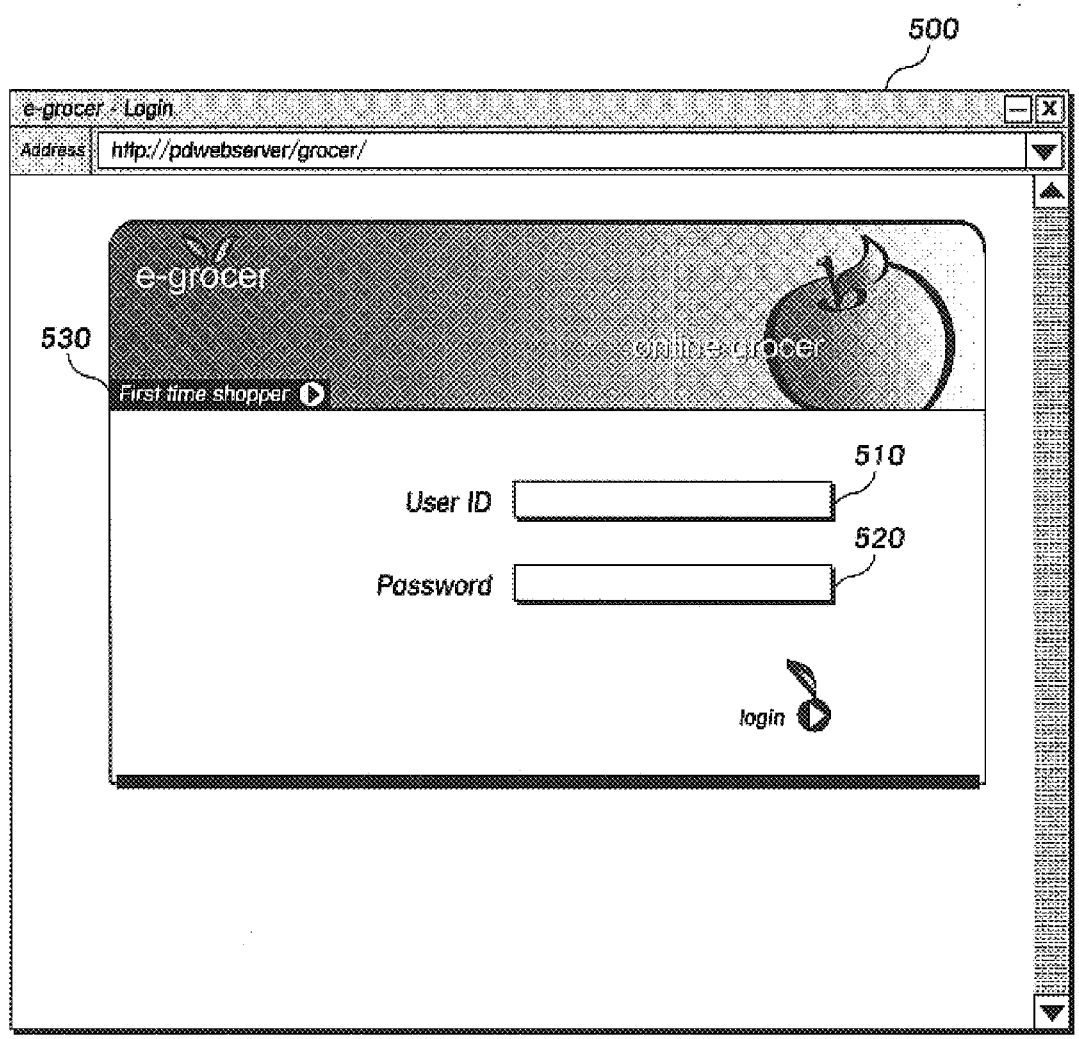

FIG. 9 is a graphic illustration of a user login window according to the current invention.

Figure 10:
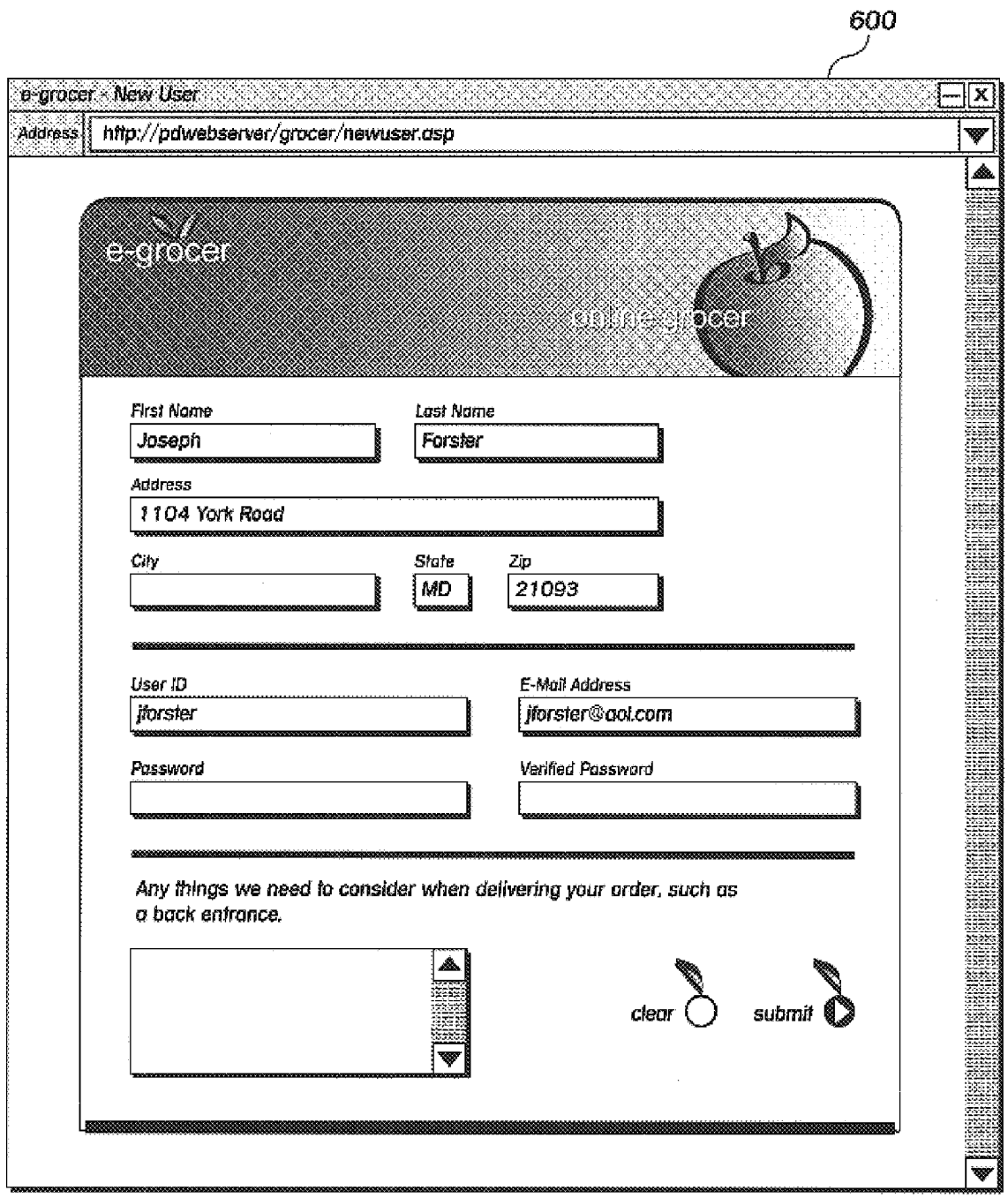

FIG. 10 is a graphic illustration of a new user sign-up window according to the current invention.

Figure 11:
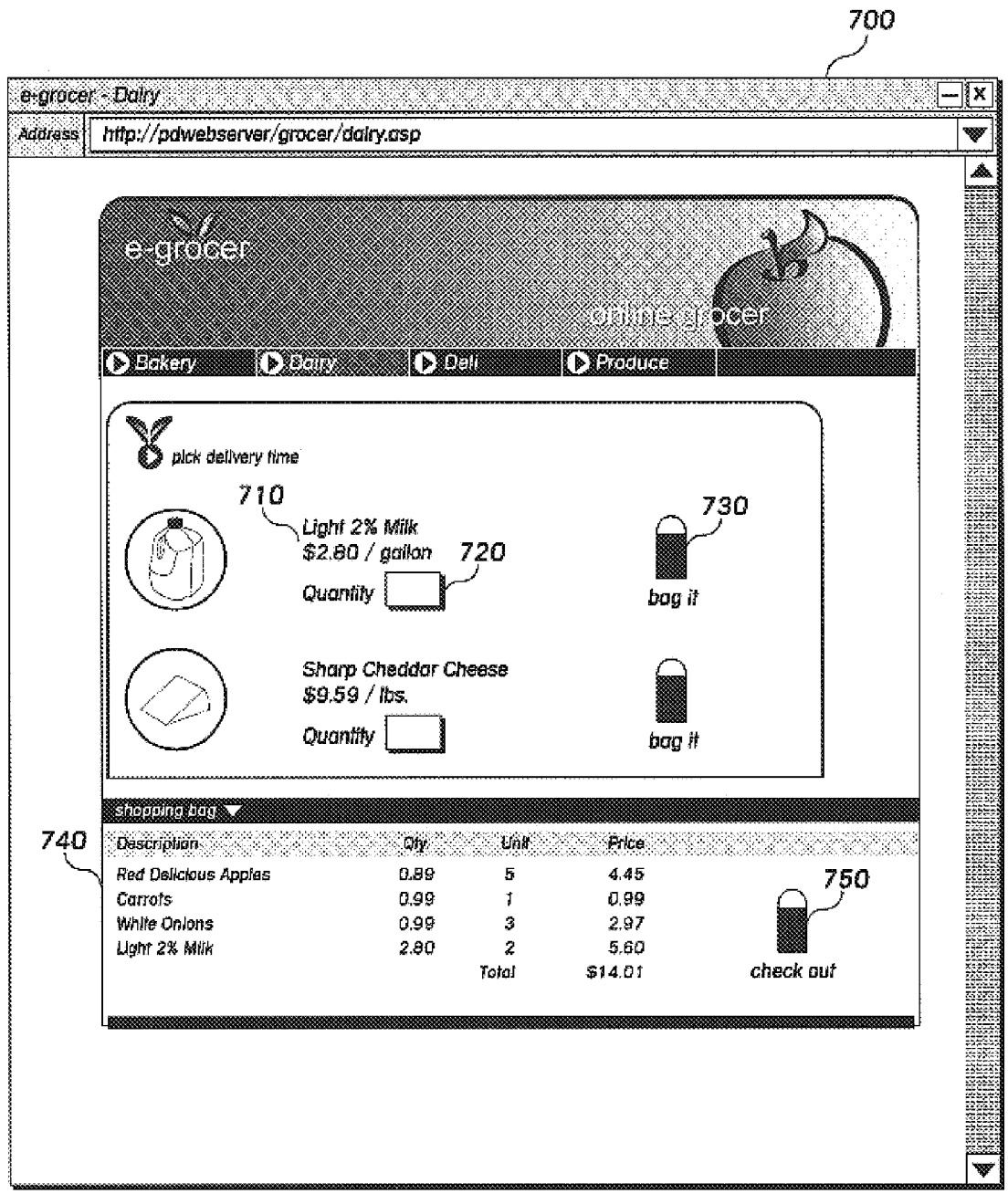

FIG. 11 is a graphic illustration of a grocery selection window according to the current invention.

Figure 12:
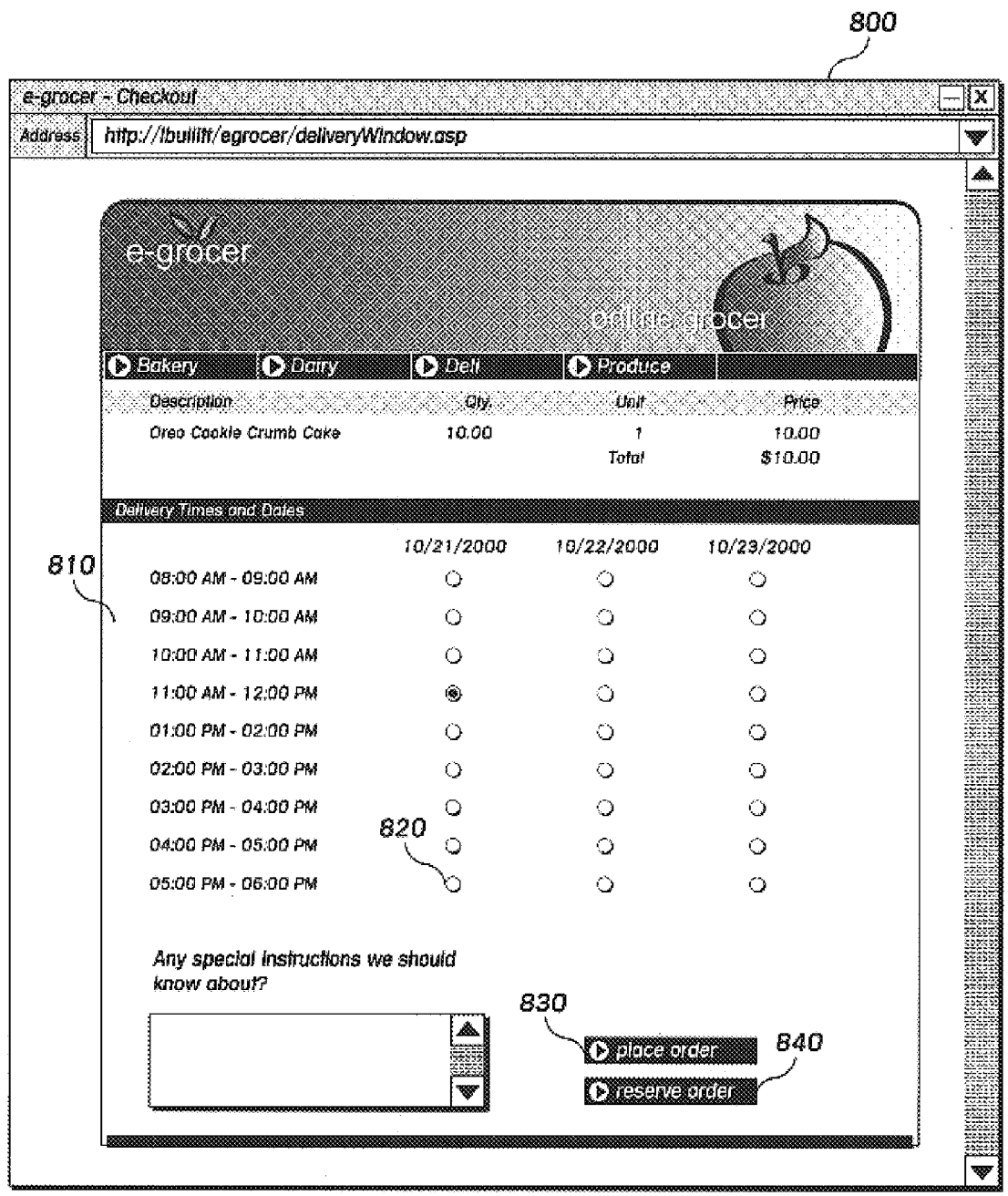

FIG. 12 is a graphic illustration of a "Delivery Times and Dates" time window selection window according to the current invention.

Figure 13:
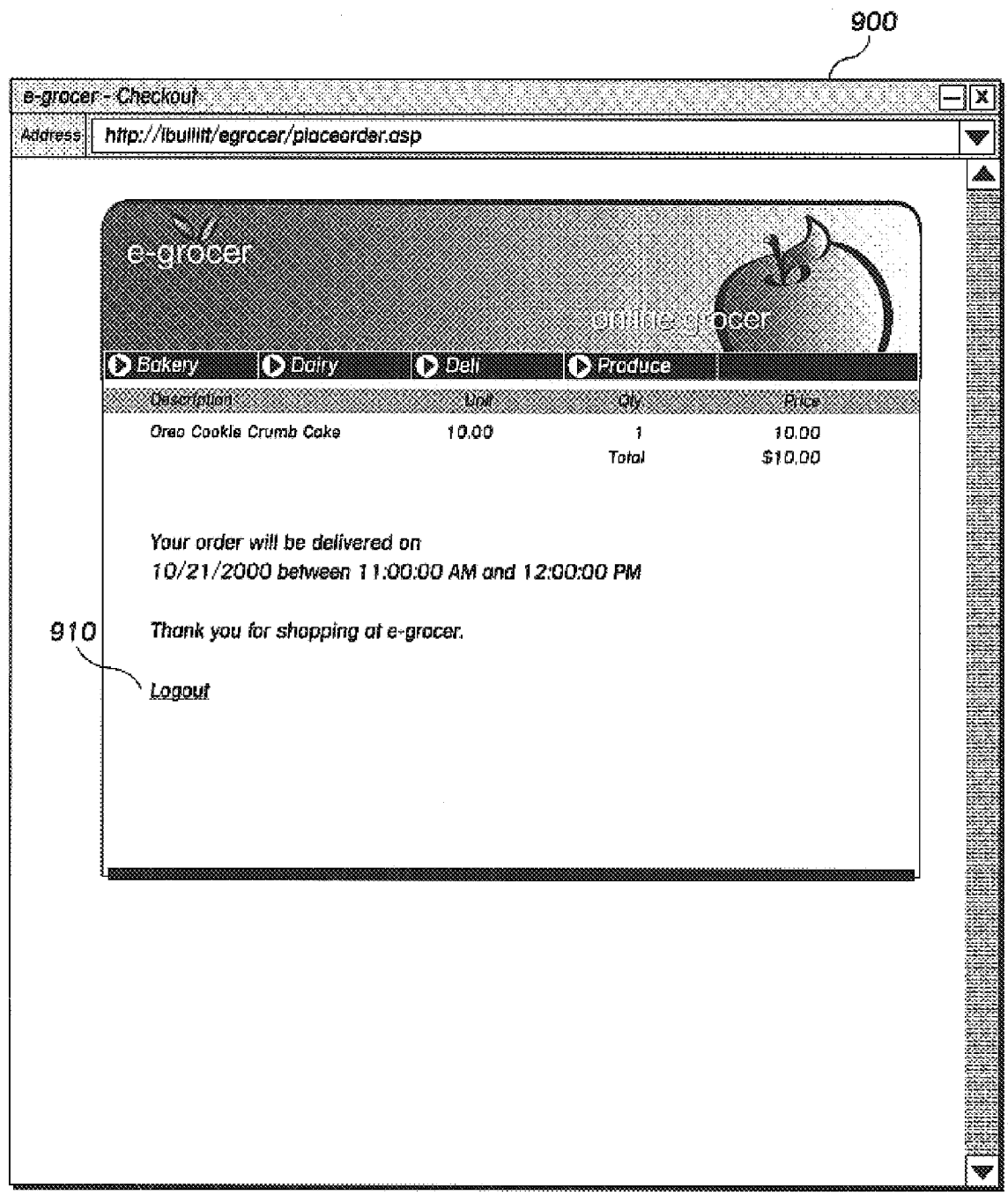

FIG. 13 is a graphic illustration of an order confirmation and logout window according to the current invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by one skilled in the art, the present invention may be embodied as a method, a data processing system, or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. More particularly, the present invention may take the form of web-implemented computer software. Any suitable computer-readable storage medium may be utilized including hard disks, CD-ROMs, optical storage devices, or magnetic storage devices.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

System Architecture

FIG. 1 shows a block diagram of a variable time window processing system 10 in accordance with a preferred embodiment of the present invention. As may be understood from this figure, the variable time window processing system 10 includes a customer client computer 20, one or more computer networks 30, a web server 40, a time window processing server 50, and a router client computer 55. As can be appreciated by one of ordinary skill in the art, the one or more computer networks 30 facilitate communication between the customer client computer 20, the web server 40, the time window processing server 50, and the router client computer 55. These one or more computer networks 30 may include any of a variety of types of computer networks such as the Internet, a private intranet, a public switch telephone network (PSTN), or any other type of network known in the art. In a preferred embodiment of the invention shown in FIG. 2, the communication link between the customer client computer 20 and the web server 40 is implemented via the Internet 32 using Internet protocol (IP), and the communication links between the web server 40, the time window processing server 50, and the router client computer 55 are implemented via a Local Area Network (LAN) 35.

FIG. 3 shows a block diagram of an exemplary embodiment of the time window processing server 50 of FIGS. 1 and 2. The time window processing server 50 includes a processor 60 that communicates with other elements within the time window processing server 50 via a system interface or bus 61. Also included in the time window processing server 50 is a display device/input device 64 for receiving and displaying data. This display device/input device 64 may be, for example, a keyboard or pointing device that is used in combination with a monitor. The time window processing server 50 further includes memory 66, which preferably includes both read only memory (ROM) 65 and random access memory (RAM) 67. The server's ROM 65 is used to store a basic input/output system 26 (BIOS), containing the basic routines that help to transfer information between elements within the time window processing server 50.

In addition, the time window processing server 50 includes at least one storage device 63, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for the personal computer 20. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. Such program modules include an operating system 80, a delivery feasibility module 100, a filtering module 200, and a cost-analysis module 300. The delivery feasibility module 100, the filtering module 200, and the cost-analysis module 300 control certain aspects of the operation of the time window processing server 50, as is described in more detail below, with the assistance of the processor 60 and an operating system 80.

Also located within the time window processing server 50 is a network interface 74, for interfacing and communicating with other elements of a computer network. It will be appreciated by one of ordinary skill in the art that one or more of the time window processing server 50 components may be located geographically remotely from other time window processing server 50 components. Furthermore, one or more of the components may be combined, and additional components performing functions described herein may be included in the time window processing server 50.

Definitions

As used in this specification, the term "time window" refers to a discrete block of time during which a particular delivery may be scheduled. For example, a delivery may be scheduled to be made within a 9:00 am–10:00 am time window. In this example, the scheduled delivery should be made sometime between 9:00 am and 10:00 am.

As used in this specification, the term "delivery route" (or, simply, "route") refers to a series of scheduled deliveries that are performed by a single delivery vehicle.

As used in this specification, the term "delivery wave" refers to a plurality of routes that scheduled at generally the same time, and usually have common beginning and ending times. A "delivery wave" generally includes a plurality of delivery windows in which deliveries may be scheduled for the various routes within the delivery wave. For example, a delivery wave may extend from 8:00 am–6:00 pm and include 10 hour-long delivery windows such as 8:00 am–9:00 am and 9:00 am–10:00 am.

As used in this specification, the terms "delivery wave capacity" and "capacity of a delivery wave" refer the maximum amount of goods that may be delivered within a particular delivery wave. This capacity is calculated by adding together the individual capacities of the various delivery trucks that are scheduled to make deliveries within the delivery wave.

As used in this specification, the term "delivery position" refers to a period of time within a given delivery route during which an additional delivery could possibly be scheduled. This period of time is defined relative to other deliveries already scheduled for the particular delivery route. Thus, for example, for a delivery route for which two deliveries have already been scheduled, three "delivery positions" exist for the route. The first delivery position represents the period of time between the time at which the delivery route is scheduled to begin and the time for which the first delivery is scheduled. The second delivery position represents the period of time between the time at which the first delivery is scheduled to end and the second delivery is scheduled to begin. Similarly, the third delivery position represents the period of time between the time at which the second delivery is scheduled to end and the time at which the delivery route is scheduled to end.

Brief Overview of System Functionality

One embodiment of the present invention provides an improved delivery scheduling system that only allows deliveries to be scheduled within a particular time window if the cost of making the delivery within the particular time window would be below a specified threshold cost. The present invention accomplishes this by first asking a customer to specify a desired date of delivery, and then determining how much it would cost to make a requested delivery within each of a pre-determined set of time-delivery windows that are scheduled for the requested day. If the cost of making the delivery within a particular window would be less than a specified threshold cost, the system displays that time window to the customer, so that the customer may schedule a delivery within the time window. If the cost of making the delivery within the time window would be greater than or equal to the specified threshold cost, the system withholds the time window from display to the customer, so that the customer may not schedule a delivery within the time window.

A preferred embodiment of the invention provides an improved delivery scheduling system that only schedules deliveries within a particular time window if: (1) it is possible to make all scheduled deliveries within the time window; and (2) it makes business sense to make each delivery within the particular time window. In operation, a system according to the present invention first receives a request from a customer that a delivery be made to a particular location on a particular date. The customer makes this request using a graphical user interface, an example of which is shown in FIGS. 9–13.

Next, the system determines which time windows to present for choice by a customer. The system does this by using a delivery feasibility module 100 to individually analyze each of a pre-determined set of time windows that are scheduled for the requested day. In doing so, the delivery feasibility module 100 determines whether it would be possible, and whether it would make business sense, to make a requested delivery within that time window. During this process, the delivery feasibility module 100 updates a "window available" attribute to indicate whether the time window is available to make the requested delivery. In a preferred embodiment of the invention, the graphical user interface withholds from display to the customer any time windows having a "window available" attribute that indicates that the window should not be made available for the delivery. An exemplary delivery feasibility module 100 is shown in FIGS. 4A through 4E.

Within the delivery feasibility module 100, the system uses a filtering module 200 (an example of which is shown in FIGS. 5A and 5B) to determine whether it would make business sense to make the delivery within any time windows within which it was determined at step 144 of the feasibility module that it would be possible to make the required delivery. During this process, the filtering module 200 identifies any time windows in which it would not make business sense to make the delivery. The filtering module 200 then indicates that these time windows should not be made available for the delivery by updating a "filter" attribute of the time window to indicate that the time window should be "filtered" from being offered to the customer.

Thus, if it would be both possible and desirable, from a business perspective, to make the delivery with a given time window, the feasibility module 100 indicates, via the time window's "window available" attribute, that the time window is available to make the requested delivery. In a preferred embodiment of the invention, the graphical user interface displays to the customer any time windows having a "window available" attribute that indicates that the window should be made available for the requested delivery.

However, if it would not be both possible and desirable, from a business perspective, to make the delivery within a given time window, the feasibility module 100 indicates, via the time window's "window available" attribute, that the time window should not be made available for the requested delivery. In a preferred embodiment of the invention, the graphical user interface withholds from display any time windows having a "window available" attribute that indicates that the window should not be made available for the delivery. In such a case, the system withholds the time window from display to the customer, so that the customer may not schedule a delivery within the time window. Alternatively, the system may display unavailable time windows in a different color or font to indicate that these time windows are not selectable by the user.

As noted above, the system determines whether it makes business sense to make a requested delivery by determining whether the cost of making the delivery is less than a certain threshold cost, which may be defined to vary based upon the type of customer requesting the delivery, the size of the order to be delivered, or any other factor prescribed by the distributor. For example, the distributor may specify that it would only make business sense to make a delivery having a delivery cost of over $30 if the customer orders $300 worth of goods or more. Similarly, the distributor may specify that it only makes business sense to make a delivery having a delivery cost of over $30 if the customer requesting the delivery orders an average of $500 or more from the distributor per week.

The system 10 uses three program modules to determine whether to offer a certain delivery time window to a customer. These modules, which include a delivery feasibility module 100, a filtering module 200, and a cost-analysis module 300, are described in greater detail below. As will be understood by one of ordinary skill in the art, other systems according to the invention could be devised that have more or less than three program modules.

Delivery Feasibility Module

An exemplary embodiment of a delivery feasibility module 100 used in the time window processing system 10 is illustrated in FIGS. 4A through 4E, which depict the steps performed in computer-executable code to determine whether it would be possible and whether it would make business sense to make a delivery within a particular time window. At beginning step 102, the system obtains a list of potential time windows for the day on which the delivery is requested. The system then advances to process the first time window at step 104. Next, the system then determines, at step 108, whether the particular time window is open for an additional delivery. In doing so, the system determines whether the time window has been manually closed. If so, the window is not open for an additional delivery.

If, at step 108, the system determines that the time window is open, the system advances to step 110 where it processes the first delivery route within the time window. The system then proceeds to step 112, where it determines whether the delivery vehicle servicing the route has the physical capacity to make the requested delivery. At this step, the system determines whether there is enough physical space on the delivery vehicle to accommodate both the delivery and any other deliveries already scheduled for the route. If so, at step 114, the system advances to process the first delivery position within the route.

As used in this specification, the term "delivery position" refers to a period of time within a given delivery route during which an additional delivery could possibly be scheduled. Thus, for example, for a delivery route for which two deliveries have already been scheduled, three "delivery positions" exist for the route. The first delivery position represents the period of time between the time at which the delivery route is scheduled to begin and the time for which the first delivery is scheduled. The second delivery position represents the period of time between the time at which the first delivery is scheduled to end and the second delivery is scheduled to begin. Similarly, the third delivery position represents the period of time between the time at which the second delivery is scheduled to end and the time at which the delivery route is scheduled to end.

After advancing to process the first delivery position within the route at step 114, the system progresses to step 116 to determine whether it would be possible to make the requested delivery at this delivery position within the geographical and time constraints associated with the delivery position. Thus, for example, in the example above for which two deliveries are already scheduled to be made within the route, the system would perform an analysis to determine whether the delivery could be made within the first delivery position (i.e. the time period between the starting time of the route, and the time that the first delivery is scheduled to begin). If it would be possible to make the delivery within this period of time without being late for, or missing, any other previously-scheduled delivery, the system proceeds to step 118, where it calculates the cost of making the proposed delivery at the current delivery position. In one embodiment of the invention, the system uses the cost analysis module 300, to calculate this cost.

Next, at step 120, the system determines whether the cost of making the proposed delivery at this delivery position is lower than a current "lowest cost delivery position" value for the route. If so, at step 122, the system sets the "lowest cost delivery position" value equal to the cost of making the proposed delivery at this delivery position. This allows the system to keep track of the currently-known lowest cost for making the delivery within the route.

After completing step 122 (or after either determining, at step 116, that it was not possible to make the proposed delivery at the current delivery position within the geographical and time constraints associated with the delivery position, or determining at step 120 that the cost of making the proposed delivery at the delivery position was lower than the current "lowest cost delivery portion" value for the route), the system proceeds to step 124 where it determines whether all delivery slots for the route have been processed. If not, the system proceeds to step 126 where it advances to process the next delivery position within the route, and then repeats the process described above, beginning at step 116, for the next delivery position within the route.

If the system determines, at step 124, that all delivery positions for the route have been processed, the system proceeds to step 128, where it determines whether the lowest cost for which the delivery may be made within the current route is less than any previously determined lowest delivery cost for any other route for the current time window. If so, at step 130, the system sets the "lowest delivery cost" value for the time window equal to the lowest cost for which the delivery may be made within the route. This allows the system to store in memory the currently known lowest cost for which the delivery may be made within the route.

After completing step 130 (or after either determining, at step 128, that the lowest cost for which the delivery may be made within the current route is not less than any previously determined lowest delivery cost for any other route for the current time window, or determining, at step 112, that the truck servicing the current route does not have the capacity to make the requested delivery), the system proceeds to step 132, where it determines whether all routes have been processed for the current time window. If not, at step 134, the system advances to process the next route by repeating the process described above beginning at step 112.

If the system determines, at step 132, that all of the routes for the current time window have been processed, the system proceeds to step 136 where it determines whether there is an additional delivery vehicle available to use to start a new route. If so, the system advances to step 138, where it calculates the cost of making the proposed delivery via a new route. The system then proceeds to step 140, where it determines whether the lowest cost for which the delivery may be made within the new route is less than any previously determined delivery cost for any other route. If so, the system advances to step 142 where it sets the "lowest delivery cost" value for the time window equal to the lowest cost for which the delivery may be made within the new route.

After completing step 142 (or either after determining, at step 140, that the lowest cost for which the delivery may be made within the new route is not less than any previously determined delivery cost for any other route, or determining, at step 136, that there is no additional delivery vehicle available to use to start a new route), the system proceeds to step 144. At step 144, the system checks to see whether it had determined that it was possible, under any circumstances, to make the requested delivery within the time window. If not, the system advances to step 146, where it updates a "window available" attribute for the time window to indicate that this time window is not available for this proposed delivery, and then proceeds to step 156, which is discussed in greater detail below.

If the system determines, at step 144, that it had determined that it was possible to make the requested delivery within the time window, the system advances to step 148, where the system applies any applicable time filters to the time window per filter module 200. The system then determines, at step 150, whether the time window has been "filtered" from consideration by any applicable time window filter. If so, the system proceeds to step 152, where it updates a "window available" attribute to indicate that the time window is not available for this proposed delivery. If not, the system executes step 154, where it updates a "window available" attribute to indicate that the time window is available for this proposed delivery.

After completing step 152 or 154, or after determining at step 108 that the time window is not open, the system advances to step 156 where it determines whether all applicable time windows have been processed. If not, the system advances to step 106 and processes the next time window beginning at step 108 as described above. If the system determines, at step 156, that all applicable time windows have been processed, the system proceeds to step 158, where it passes time window availability information to a web server.

The web server may use this information to determine which time windows to offer to a customer for the requested delivery. For example, the web server may display to a customer all time windows for which the "window available attribute" indicates that the time window is available for the proposed delivery. Similarly, the web server may withhold from display to a customer all time windows for which the "window available attribute" indicates that the time window is not available for the proposed delivery. Thus, in this example, the customer will only be shown time windows for which it would be both possible, and for which it would make business sense, to make the delivery.

Filtering Module

An exemplary embodiment of a filtering module 200 according to the present invention is illustrated in FIGS. 5A and 5B, which depict the steps performed in computer-executable code to determine whether making a delivery within a particular time window makes business sense. At beginning step 203, the system receives the customer type for which the filter applies. For example, as explained in more detail below, the filter may be defined to only apply to "Gold" type customers, which, for example, order an average of $500 or more from the distributor per week.

The system then proceeds to step 205, where the system retrieves the "lowest delivery cost" value for the time window that was determined in steps 230 and 280 of the delivery feasibility module 100. The system then advances to step 210, where it identifies a delivery wave (i.e. a block of time during which several delivery routes are scheduled) that contains the time window. Next, at step 215, the system determines the percentage of the delivery wave's capacity that is already consumed by confirmed deliveries. The system then proceeds to step 220, where it identifies any filters that correspond to the customer's customer type. The system then executes step 225, where it advances to process the first of these filters.

Next, at Step 230, the system identifies the threshold reserved capacity at which the filter would begin to apply. For example, the filter may be configured to apply only after 80% of the delivery capacity of the delivery wave has been reserved for confirmed deliveries. As discussed in detail below, this allows the system to prevent some types of orders from being scheduled when the delivery window is close to being fully reserved.

Next, the system executes step 235, at which the system identifies the threshold delivery cost for the filter. In a preferred embodiment of the invention, if the cost of making a delivery is greater than or equal to this cost, and the filter otherwise applies to the order, the filter will cause the system to indicate that the time window should be withheld from display to the customer. This functionality would be useful, for example, to exclude any time window from display if the cost of making a requested delivery within the time window is $30 or more.

Steps 230 and 235 are generally executed well before a customer places an order. More specifically, these steps are first executed when the distributor defines a time window filter using an Add Filter window, such as the Add Filter window shown in FIG. 7. As may be understood from this figure, the distributor configures the filter by using a "customer-type" drop-down menu 310 to specify the type of customer to which the filter applies, and then entering the threshold delivery cost in a threshold delivery cost entry box 320. Finally, the user specifies the percentage of delivery capacity that must be reserved before the filter is to apply by using the threshold percentage box 325 and the capacity/ resources drop-down menu 330. Alternatively, the user may use these two fields to specify that the filter is to apply after a certain percentage of resources (e.g. delivery trucks) have been fully scheduled for delivery.

It is important to note that a customer's customer type may be defined in many different ways. In a preferred embodiment of the invention, customer type is based upon the amount of goods that the customer regularly orders from the distributor. For example, a customer who orders $500 or more worth of goods from the distributor every week on the average may be designated a gold customer. Similarly, a customer who orders between $250 and $499 worth of goods from the distributor every week on the average may be designated a silver customer. By the same token, a customer who orders $249 or less worth of goods from the distributor every week on the average may be designated to be a bronze customer.

In an alternative embodiment of the invention, customer type is based upon the value of the order placed by the customer. For example, customers placing an order for $500 or more might be considered gold customers, while customers placing an order for between $200 and $499 might be considered silver customers. As will be understood by one of ordinary skill in the art, many other factors (such as the customer's credit rating, financial history, location, the length of the business relationship with the customer, etc. . . . ) may be used to determine the appropriate customer type for each customer.

The system then proceeds to step 240, where it determines whether the percentage of the delivery wave's capacity that is already set aside for confirmed deliveries is greater than or equal to the threshold "reserved" capacity specified within the time window filter. Thus, if the filter were defined so that it applies when 80% or more of the delivery capacity associated with the delivery wave has been reserved for confirmed deliveries, and if 80% or more of the delivery capacity associated with the delivery wave had already been set aside for other deliveries, the answer to the inquiry posed at step 240 would be "yes." However, if 79% or less of the delivery capacity associated with the delivery wave had been set aside for other deliveries, the answer to the inquiry posed at step 240 would be "no."

If the percentage of the delivery wave capacity that is already set aside for confirmed deliveries is greater than, or equal to, the threshold capacity specified by the time window filter, the system proceeds to step 245, where it determines whether the cost of making the requested delivery (which is represented by the "lowest delivery cost" value for the time window) is greater than or equal to the threshold delivery cost specified within the time window filter. If so, the system proceeds to step 260, where it updates a "filter" attribute of the time window to indicate that the time window should be "filtered" from display to the customer.

If the system either determines at step 245 that the cost of making the requested delivery is not greater than or equal to the threshold delivery cost for the time filter, or the system determines, at step 240, that the percentage of the delivery wave's capacity that is already consumed by confirmed deliveries is not greater than or equal to the threshold "reserved" capacity specified by the time filter, the system proceeds to step 250, where it determines whether all applicable filters have been processed. If so, the system proceeds to Step 265 where it updates a "filter" attribute of the time window to indicate that the time window should not be "filtered" from display to the customer. If not, the system advances to the next applicable filter at step 255, and then repeats the process described above for the next filter beginning at step 230.

Alternative Embodiment of the Filtering Module

An exemplary embodiment of a filtering module 400 according to an alternative embodiment of the invention is illustrated in FIG. 8. At beginning step 405, the system receives a customer type for the customer. Next, at step 410, the system converts the customer type into a numeric customer factor. In a preferred embodiment of the invention, this customer factor ranges from 1–10, with 1 corresponding to the most desirable customers and 10 corresponding to the least desirable customers. For example, in a system having only gold, silver, and bronze customers, a gold customer type might correspond to a customer factor of 1, a silver customer type might correspond to a customer factor of 5, and a bronze customer type might correspond to a customer factor of 10.

Next, at step 415, the system determines the cost of making the requested delivery within the time window. This determination may be made using the cost analysis module, which is depicted in FIGS. 6A and 6B and discussed below. The system then converts this cost of making the requested delivery into a numerical system factor (which may also be called a "cost factor") at step 420. In a preferred embodiment of the invention, such system factors range from 1–10, with 1 corresponding to the lowest-cost deliveries and 10 corresponding to the most expensive deliveries.

In a preferred embodiment of the invention, the system converts the cost of making the requested delivery into a numerical system factor using a conversion table such as the one shown below:

| Cost of Delivery | Cost Factor |
|---|---|
| $0–10.00 | 1 |
| $10.01–$20.00 | 5 |
| $20.01 and above | 10 |

When using such a conversion table, any cost of delivery that falls within the range of delivery costs in the left-hand field in a particular row in the table is converted into the cost factor that is displayed in the right-hand field that particular row. Thus, a cost of delivery of $15.00 would correspond to a cost factor of 1, and a cost of delivery of $40.00 would correspond to a cost factor of 5. Many variations of such a conversion table may be envisioned by one skilled in the art.

The system then proceeds to step 425, where it determines whether the sum of the system factor and the customer factor is less than a pre-determined threshold "display window" value. If so, the system proceeds to step 430 and updates a "filter" attribute of the time window to indicate that the time window should not be "filtered" from display to the customer. If not, the system proceeds to step 435 and updates a "filter" attribute of the time window to indicate that the time window should be "filtered" from display to the customer.

For example, a distributor might determine that it does not make business sense to make a delivery within a time window when the sum of the customer factor and the system factor is greater than or equal to 6. Thus, in a situation where the customer factor were 1 and the system factor were 4, the system would display the time window because the sum of the customer factor and the system factor would be less than 6. By the same reasoning, the system would not display a time window for which the customer factor were 5, and the system factor were 6, because the sum of these two values is greater than 6.

In an alternative embodiment of the invention, relatively high customer values (such as 10) correspond to very good customers, and relatively low customer values (such as 0) correspond to relatively undesirable customers. Also, in this embodiment of the invention, relatively low system factors correspond to relatively high delivery costs, and relatively high system factors correspond to relatively low delivery costs. In this embodiment of the invention, the system determines whether the sum of the system factor and the customer factor is greater than or equal to a pre-determined threshold display value. If so, the system displays the time window to the customer. If not, the system does not display the time window to the customer.

In a further alternative embodiment of the invention, each factor is weighted before the customer and system factors are added and compared to a threshold display value. For example, such weighting would be useful in a situation where, in determining whether to display a particular time window, delivery cost is considered twice as important as customer type. In such a situation, the cost factor would be multiplied by two before being added to the customer factor, and before the resulting sum is compared with the threshold display value to determine whether to display a particular time window. It should be understood that many alternative mathematical algorithms that include the cost and system factors could be used to determine whether to display a particular time window.

Cost Analysis Module

Various methods for determining the cost of making a particular delivery are known in the art. For example, several publicly-available prior art routing and scheduling programs (for example, Roadnet 5000) are capable of determining the cost of making a delivery to a particular customer. Such routing and scheduling programs may be implemented, for example, on a routing client computer 60. "User's Guide to Roadnet 5000, Routing and Scheduling System, Version 5.6" (Roadnet Technologies, Inc. 1996), and "Roadnet 5000, Operations Guide, Version 6.02" (Roadnet Technologies, Inc. 1997) are incorporated herein by reference.

An exemplary cost analysis module is depicted in FIGS. 6A and 6B. However, it should be understood that numerous variations of such a cost analysis module would come to mind to one of ordinary skill in the art.

As noted above, an exemplary embodiment of a cost analysis module 300 according to the present invention is illustrated in FIGS. 6A and 6B. These figures depict the steps performed in computer-executable code to determine the cost of making a particular delivery within a particular time window. At beginning step 305, the system determines the time that would be required to make the delivery, as is well known in the art. For example, the system may calculate this time by adding together: (1) the estimated travel time associated with the delivery; (2) any estimated delays associated with making the delivery; and (3) the time that it would take to load and unload the items to be delivered.

Next, at step 310, the system determines the driver's standard wages associated with the delivery. The system does this by multiplying the amount of delivery time for which the driver would be paid the driver's standard hourly wage by the driver's standard hourly wage. The system then determines, at step 315, the driver's overtime wages that are associated with the delivery. The system does this by multiplying the amount of delivery time for which a driver would be paid the driver's overtime hourly wage by the driver's overtime hourly wage.

The system then executes steps 320, 325, 330, 335, and 340, in which it determines, respectfully, (1) the fuel costs associated with making the proposed delivery; (2) the vehicle maintenance costs associated with the proposed delivery; (3) the vehicle loading costs associated with making the proposed delivery; (4) any toll road costs that would be associated with the proposed delivery; and (5) the vehicle preparation costs associated with making the delivery. Such assessments are known in the prior art (e.g. the Roadnet 5000 routing and scheduling program).

Next, at step 345, the system determines whether it would be possible to make the proposed delivery without adding a new truck. Such a determination is made in a manner known in the prior art (e.g. the Roadnet 5000 routing and scheduling program.) If so, the system proceeds to step 355. If not, the system first determines the costs associated with adding a new truck to accommodate the delivery and then proceeds to step 355. At step 355, the system determines any other miscellaneous costs associated with making the proposed delivery. Finally, at step 360, the system calculates the total costs associated with making the delivery by adding together any costs identified in steps 305, 310, 315, 320, 325, 330, 335, 340, 350, and 355.

Operation of a System According to a Preferred Embodiment of the Invention

To use a system according to a preferred embodiment of the invention, a distributor first defines a series of filters that apply to the various time windows as described above in reference to the filtering module. After the various filters have been defined, a customer may enter the system by using the customer client computer 20 to log on to the distributor's web site. An exemplary "login" window 500 according to a preferred embodiment of the invention is shown in FIG. 9. While this preferred embodiment is described below in relation to a routing and scheduling system for grocery delivery, it could also be used in many other contexts, such as home video delivery and laundry delivery.

As may be understood from FIG. 9, the user logs onto the website by entering the customer's user identification code in a "USER ID" Box 510 and the customer's password in a "Password" Box 520. First time shoppers enter the system using a "first time shopper" key 530, which takes them to a new user sign-up window 600, an example of which is shown in FIG. 10. As may be understood from this figure, the new user sign-up window 600 allows a new user to define a User ID and password that are associated with their name, address, and e-mail address and provide a means of payment. This information is then stored in a customer data database for later reference.

After the customer logs onto the system, the customer may shop for groceries by browsing through various grocery selection windows 700. An example of a grocery selection window according to a preferred embodiment of the invention is shown in FIG. 11. As may be understood from this figure, the user may select various grocery items 710 by specifying the quantity of groceries desired in the quantity box 720, and then selecting a "bag it" key 730. Selecting the "bag it" key 730 adds the selected item to a list of ordered items 740 that is displayed at the bottom of the grocery selection window 700. At any time, the customer may press a "check out" button 750 to schedule a time for the delivery and/or the confirm the delivery.

After selecting the "check out" button 750, the system requests the user to specify a day on which the delivery is to be made. After the user selects an appropriate delivery day, the system determines which, if any, time windows are available for the particular day. The system does this by first identifying any time windows scheduled for the requested day, and then determining, for each individual time window, whether it would be possible, and whether it would make business sense, to schedule the delivery for the given time window. In a preferred embodiment of the invention, the system withholds from display any individual time windows for which a "window available" attribute indicates that the time window is not "available" for the proposed delivery. As noted above, a time window delivery feasibility module 100 will determine that a time window is unavailable if the time window if: (1) it would not be possible to make the delivery within the individual time window; or (2) it would not make business sense to make the delivery within the individual time window. The system displays all other time windows 810 to the user on a "Delivery Times and Dates" selection window 800, an example of which is shown in FIG. 12. (In FIG. 12, the 12:00 pm–1:00 pm time window has been omitted from display because it would either not be possible, or it would not make business sense to make the delivery within the time window.)

The customer may then select a convenient time window for the delivery by activating a radio button 820 that corresponds to the desired time window. After selecting a time window for delivery, the customer may then either reserve the time window and continue shopping by selecting a "reserve order" button 840, or move on to a confirmation and logout window 900 by selecting a "place order" button 830. An exemplary confirmation and logout window 900 is shown in FIG. 13. On the confirmation and logout window 900, the user may review the order and log off of the system by selecting a "logout" button 910.

If the user chooses to reserve the time window and continue shopping, the system reserves the time window so that no other customers may schedule deliveries within this time window while the time window is reserved. The customer may, thus, continue shopping with the assurance that, when the customer is finished shopping, they can confirm the order for delivery within the reserved time window. Thus, in this case, when the customer selects the "check out" button after shopping, the customer is merely asked to confirm that they still would like the delivery to be made within the reserved time window. If so, the system confirms and schedules the delivery.

In a preferred embodiment of the invention, the system is configured to only reserve the time window for a certain, predetermined amount of time. If the customer does not confirm the delivery within this period of the time, the system releases the time window from its reserved status so that it is made available to other customers. In such a situation, when the user selects the "check out" button 750 after the reserved time window has been released to other customers, the system again determines, based on current conditions, whether it would: (1) be possible to make the delivery within the formerly reserved time window; and (2) make business sense to make the delivery within the formerly reserved time window. The system determines whether it would make business sense to make the delivery within the time window in the manner discussed above using the current system data to calculate, for example, an updated cost of delivery associated with making the delivery within the requested time window.

If both of the above conditions are satisfied, the system merely asks the customer to confirm that they would still like the delivery to be made within the formerly reserved time window. If either one of the conditions is not satisfied (i.e. under current conditions, it would no longer be possible, and/or it would not be desirable from a business perspective, to make the delivery) the system does not display the formerly-reserved time window. Rather, the system offers the customer several alternative time windows in which it would be both possible, and desirable from a business perspective, to make the delivery. The user may then select one of the alternative time windows, confirm the delivery, and log off of the system.

In a further preferred embodiment of the invention, the system runs an optimization routine to optimize a delivery route immediately after each new delivery is added to the route. To do this, the system conducts a routing analysis in which the route is optimized to minimize the cost and/or time associated with making the deliveries. Such a routing analysis may be performed, for example, using a commercially available routing and scheduling program, such as Roadnet 5000, that is implemented on a routing client computer 60. This provides for a system that dynamically optimizes each route in real time as the route changes.

As a result, at any given point in time, each route should be configured to complete its various deliveries along a route that has been developed to maximize efficiency and reduce the costs associated with making the various deliveries.

Exemplary Grocery Delivery System

In order to further illustrate possible implementations of the invention, an exemplary grocery delivery system according to the present invention is described below. In this system, only two customer types have been defined by the distributor. The distributor has defined gold customers as customers who, on the average, order $500 or more worth of groceries from the distributor per week. Similarly, the distributor has defined silver customers to be customers who, on the average, order less than $500 worth of groceries from the distributor per week.

The distributor does not want to take any orders for which delivery costs would be $30 or more. To accomplish this, the distributor defines two different filters. First, using an entry screen such as the screen shown in FIG. 7, the distributor defines a first filter that specifies that, when 0% or more of the capacity of a delivery wave is occupied with confirmed deliveries, the system should not offer silver customers any time windows for which delivery costs would be $30 or more. Additionally, the distributor defines a second filter that specifies that, when 0% or more of the capacity of a delivery wave is occupied with confirmed deliveries, the system should not offer gold customers any time windows for which delivery costs would be $30 or more. These filters work together to prevent the display of any time windows to any customer for which delivery costs would be $30 or more.

The distributor also wishes to avoid adding additional orders established near a cut-off time for accepting orders for the next delivery day, but would be willing to add such orders if the delivery costs are relatively low. Also, the distributor would be more willing to add such a delivery for a very good customer (i.e. a gold customer), than for a standard customer (i.e. a silver customer). To accomplish these goals, the distributor defines two additional filters. First, the distributor defines a third filter that specifies that, when 80% or more of the capacity of a delivery wave is occupied with confirmed deliveries, the system should not offer the time window to silver customers if the delivery costs associated with delivering within the window would be $10 or more. Additionally, the distributor defines a fourth filter that specifies that, when 80% or more of the delivery capacity of the delivery wave is occupied with confirmed deliveries, the system should not offer the time window to gold customers if the delivery costs associated with delivering within the window would be $20 or more. Thus, after 80% of the delivery capacity of a given delivery wave has been reserved for other deliveries, the system will only schedule a delivery if: (1) the customer is a gold customer and the delivery would cost less than $20; or (2) the customer is a silver customer and the delivery would cost less than $10.

In one example, a gold customer might log on to this exemplary system on Thursday, September 27, select several grocery items to be delivered, and then try to schedule an order for Friday, September 28. If the customer tried to schedule a delivery within a delivery wave for which 85% of the delivery capacity of the current delivery wave had already been reserved for current deliveries, the fourth filter would apply and the system would filter from display to the customer any time window for which delivery would cost $20 or more. Similarly, if the customer tried to schedule a delivery within a delivery wave for which only 70% of the delivery capacity of the current delivery wave had already been reserved for current deliveries, the second filter would apply and the system would filter from display to the user any time window for which delivery would cost $30 or more.

In another example, a silver customer might log on to this exemplary system on Thursday, September 27, select several grocery items to be delivered, and then try to schedule an order for Friday, September 28. If the customer tried to schedule a delivery within a delivery wave for which 85% of the delivery capacity of the current delivery wave had already been reserved for current deliveries, the third filter would apply and the system would filter from display to the user any time window for which delivery would cost $10 or more. Similarly, if the customer tried to schedule a delivery within a delivery wave for which only 70% of the delivery capacity of the current delivery wave had already been reserved for current deliveries, the first filter would apply and the system would filter from display to the user any time window for which delivery would cost $30 or more.

Conclusion

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What we claim is:

1. A computer-readable medium storing computer-executable instructions for performing the steps of:

identifying a time window in which a delivery may be made to a customer;

determining a cost of delivery, said cost of delivery comprising a cost of making said delivery to said customer within said time window;

comparing said cost of delivery with a threshold cost; and responsive to said cost of delivery being less than said threshold cost, indicating that said time window is available for said delivery.

2. The computer-readable medium of claim 1, wherein said computer-readable medium further stores computer-executable instructions for, responsive to said cost of delivery being less than said threshold cost, displaying said time window to said customer.

3. The computer-readable medium of claim 1, wherein said computer-readable medium further stores computer-executable instructions for, responsive to said cost of delivery being equal to said threshold cost, indicating that said time window is not available for said delivery.

4. The computer-readable medium of claim 1, wherein said computer-readable medium further stores computer-executable instructions for, responsive to said delivery cost being greater than said threshold cost, indicating that said time window is not available for said delivery.

5. The computer-readable medium of claim 1, wherein said computer-readable medium further stores computer-executable instructions for, responsive to said delivery cost being greater than said threshold cost, withholding said time window from display to said customer.

6. The computer-readable medium of claim 5, wherein said computer-readable medium further stores computer-executable instructions for receiving said threshold cost from a user.

7. The computer-readable medium of claim 5, wherein said cost of delivery comprises labor costs and transportation costs associated with said delivery.

8. The computer-readable medium of claim 7, wherein said cost of delivery further comprises vehicle preparation costs, and vehicle loading costs associated with said delivery.

9. The computer-readable medium of claim 5, wherein said time window is a first time window, said cost of delivery is a first cost of delivery, and said computer-readable medium further stores computer-executable instructions for performing the steps of:

identifying a second time window in which said delivery may be made to a customer;

determining a second cost of delivery, said second cost of delivery comprising a cost of making said delivery to said customer within said second time window;

comparing said second cost of delivery with said threshold cost; and responsive to said second cost of delivery being less than said threshold cost, displaying said second time window to said customer.

10. The computer-readable medium of claim 5, wherein said time window is a first time window, said cost of delivery is a first cost of delivery, and said computer-readable medium further stores computer-executable instructions for performing the steps of:

identifying a second time window in which said delivery may be made to a customer;

determining a second cost of delivery, said second cost of delivery comprising a cost of making said delivery to said customer within said second time window;

comparing said second cost of delivery with said threshold cost; and responsive to said second cost of delivery being less than said threshold cost, indicating that said second time window is available for said delivery.

11. The computer-readable medium of claim 10, wherein said computer-readable medium further stores computer-executable instructions for, responsive to said second cost of delivery being equal to said threshold cost, indicating that said second time window is not available for said delivery.

12. The computer-readable medium of claim 10, wherein said computer-readable medium further stores computer-executable instructions for, responsive to said second cost of delivery being equal to said threshold cost, withholding said second time window from display to said customer.

13. The computer-readable medium of claim 10, wherein said computer-readable medium further stores computer-executable instructions for, responsive to said second delivery cost being greater than said threshold cost, indicating that said second time window is not available for said delivery.

14. The computer-readable medium of claim 10, wherein said computer-readable medium further stores computer-executable instructions for receiving said threshold cost from a user.

15. The computer-readable medium of claim 10, wherein said second cost of delivery comprises labor costs, transportation costs, vehicle preparation costs, and vehicle loading costs.

16. The computer-readable medium of claim 1, wherein said delivery is a requested delivery and said time window is associated with a delivery vehicle, said delivery vehicle being already scheduled to make at least one confirmed delivery within said time widow, and wherein said step of identifying said time window comprises the step of determining whether said delivery vehicle can make both said at least one confirmed delivery and said requested delivery within said time window.

17. The computer-readable medium of claim 1, wherein said delivery is a requested delivery and said time window is associated with a delivery vehicle, said delivery vehicle having a delivery capacity, and wherein said step of identifying said time window comprises the step of determining whether said delivery capacity of said delivery vehicle would be exceeded by said requested delivery.

18. The computer-readable medium of claim 2, wherein said step of displaying said time window to said customer comprises displaying said time window to said customer for a predetermined period of time, and wherein said computer-readable medium further stores computer-executable instructions for performing the steps of:
determining an updated cost of delivery, said updated cost of delivery comprising a cost of making said delivery to said customer within said time window;
comparing said updated cost of delivery with said threshold cost; and
in response to said updated cost of delivery being less than said threshold cost, displaying said time window to said customer.

19. The computer-readable medium of claim 18, wherein said computer-readable medium further stores computer-executable instructions for, in response to said updated cost of delivery being equal to said threshold cost, withholding said time window from display to said customer.

20. The computer-readable medium of claim 19, wherein said computer-readable medium further stores computer-executable instructions for, in response to said updated cost of delivery being greater than said threshold cost, withholding said time window from display to said customer.

21. The computer-readable medium of claim 1, wherein said threshold cost is defined to vary based upon the type of customer requesting said delivery.

22. A computer-readable medium storing computer-executable instructions for performing the steps of:
identifying a time window in which a delivery may be made to a customer, said time window being associated with a delivery wave delivery capacity;
comparing a portion of said delivery wave delivery capacity that has been allocated to deliveries with a threshold value;
responsive to said portion of said delivery wave delivery capacity that has been allocated to deliveries being greater than said threshold value, performing the steps of:
(a) determining a cost of delivery, said cost of delivery comprising a cost of making said delivery to said customer within said time window;
(b) comparing said cost of delivery with a threshold cost; and
(c) responsive to said cost of delivery being less than said threshold cost, indicating that said time window is available for said delivery.

23. The computer-readable medium of claim 22, wherein said computer-readable medium further stores computer-executable instructions for, responsive to said cost of delivery being less than said threshold cost, displaying said time window to said customer.

24. The computer-readable medium of claim 23, wherein said computer-readable medium further stores computer-executable instructions for, in response to said cost of delivery being equal to said threshold cost, indicating that said time window is not available for said delivery.

25. The computer-readable medium of claim 22, wherein said delivery is a requested delivery and said time window is associated with a delivery vehicle, said delivery vehicle being already scheduled to make at least one confirmed delivery within said time widow, and wherein said step of identifying said time window comprises the step of determining whether said delivery vehicle can make both said at least one confirmed delivery and said requested delivery within said time window.

26. The computer-readable medium of claim 22, wherein said delivery is a requested delivery and said time window is associated with a delivery vehicle, said delivery vehicle having a delivery capacity, and wherein said step of identifying said time window comprises the step of determining whether said delivery capacity of said delivery vehicle would be exceeded by said requested delivery.

27. The computer-readable medium of claim 22, wherein said cost of delivery comprises labor costs and transportation costs associated with making said delivery.

28. The computer-readable medium of claim 27, wherein said cost of delivery further comprises vehicle preparation costs, and vehicle loading costs associated with making said delivery.

29. A computer-readable medium storing computer-executable instructions for performing the steps of:
identifying a time window in which a delivery may be made to a customer;
identifying a customer type associated with said customer;
determining a cost of delivery, said cost of delivery comprising a cost of making said delivery to said customer within said time window;
comparing said cost of delivery with a first threshold cost if said customer type corresponds to a first customer type;

comparing said cost of delivery with a second threshold cost if said customer type corresponds to a second customer type;

indicating that said time window is available for said delivery if either:
   (a) said cost of delivery is less than said first threshold cost, and said customer type corresponds to said first customer type; or
   (b) said cost of delivery is less than said second threshold cost, and said customer type corresponds to said second customer type.

30. The computer-readable medium of claim 29, wherein said customer classification corresponds to a size of an order placed by said customer.

31. The computer-readable medium of claim 29, wherein said cost of delivery comprises labor costs and transportation costs associated with making said delivery.

32. The computer-readable medium of claim 31, wherein said cost of delivery further comprises vehicle preparation costs, and vehicle loading costs associated with making said delivery.

33. A method of displaying delivery time windows, said method comprising the steps of:
   identifying a time window in which a delivery may be made to a customer;
   determining a cost of delivery, said cost of delivery comprising a cost of making said delivery to said customer within said time window;
   comparing said cost of delivery with a threshold cost; and
   responsive to said cost of delivery being less than said threshold cost, indicating that said time window is available for said delivery.

34. The method of claim 33, further comprising the step of, responsive to said cost of delivery being less than said threshold cost, displaying said time window to said customer.

35. The method of claim 33, further comprising the step of, responsive to said cost of delivery being equal to said threshold cost, indicating that said time window is not available for said delivery.

36. The method of claim 33, further comprising the step of, responsive to said cost of delivery being equal to said threshold cost, withholding said time window from display to said customer.

37. The method of claim 33, wherein said method further comprises the step of, responsive to said delivery cost being greater than said threshold cost, indicating that said time window is not available for said delivery.

38. The method of claim 37, wherein said time window is a first time window, said cost of delivery is a first cost of delivery, and said method further comprises the steps of:
   identifying a second time window in which said delivery may be made to a customer;
   determining a second cost of delivery, said second cost of delivery comprising a cost of making said delivery to said customer within said second time window;
   comparing said second cost of delivery with said threshold cost; and
   responsive to said second cost of delivery being less than said threshold cost, indicating that said second time window is available for said delivery.

39. The method of claim 38, wherein said method further comprises the step of, responsive to said second delivery cost being greater than said threshold cost, indicating that said second time window is not available for said delivery.

40. The method of claim 33, responsive to said delivery cost being greater than said threshold cost, withholding said time window from display to said customer.

41. The method of claim 33, wherein said method further comprises the step of receiving said threshold cost from a user.

42. The method of claim 33, wherein said cost of delivery comprises labor costs, transportation costs associated with making said delivery.

43. The method of claim 33, wherein said cost of delivery further comprises vehicle preparation costs and vehicle loading costs associated with making the delivery.

44. The method of claim 37, wherein said time window is a first time window, said cost of delivery is a first cost of delivery, and said method further comprises the steps of:
   identifying a second time window in which said delivery may be made to a customer;
   determining a second cost of delivery, said second cost of delivery comprising a cost of making said delivery to said customer within said second time window;
   comparing said second cost of delivery with said threshold cost; and
   responsive to said second cost of delivery being less than said threshold cost, displaying said second time window to said customer.

45. The method of claim 44, wherein said method further comprises the step of, responsive to said second cost of delivery being equal to said threshold cost, withholding said second time window from display to said customer.

46. The method of claim 44, wherein said method further comprises the step of, responsive to said second delivery cost being greater than said threshold cost, withholding said second time window from display to said customer.

47. The method of claim 44, wherein said second cost of delivery comprises labor costs and transportation costs associated with making said delivery.

48. The method of claim 33, wherein said delivery is a requested delivery and said time window is associated with a delivery vehicle, said delivery vehicle being already scheduled to make at least one confirmed delivery within said time widow, and wherein said step of identifying said time window comprises the step of determining whether said delivery vehicle can make both said at least one confirmed delivery and said requested delivery within said time window.

49. The method of claim 33, wherein said delivery is a requested delivery and said time window is associated with a delivery vehicle, said delivery vehicle having a delivery capacity, and wherein said step of identifying said time window comprises the step of determining whether said delivery capacity of said delivery vehicle would be exceeded by said requested delivery.

50. The method of claim 33, wherein said step of displaying said time window to said customer comprises displaying said time window to said customer for a predetermined period of time, and further including the steps of:
   determining an updated cost of delivery, said updated cost of delivery comprising a cost of making said delivery to said customer within said time window;
   comparing said updated cost of delivery with said threshold cost; and
   responsive to said updated cost of delivery being less than said threshold cost, displaying said time window to said customer.

51. The method of claim 50, further comprising the step of, responsive to said updated cost of delivery being equal to said threshold cost, withholding said time window from display to said customer.

52. The method of claim 51, further comprising the step of, responsive to said updated cost of delivery being greater than said threshold cost, withholding said time window from display to said customer.

53. A method of determining whether to offer to make a requested delivery within a particular delivery time window, said method comprising the steps of:
    determining a cost factor associated with making said requested delivery within said particular delivery time window;
    determining a customer factor associated with a customer requesting said requested delivery;
    identifying a threshold "display window" value;
    combining said cost factor and said customer factor to derive a combined delivery factor; and
    in response to said combined delivery factor being greater than said "display window" value, determining to offer to make said requested delivery within said particular delivery time window.

54. The method of claim 53, further including the step of, in response to said combined delivery factor being less than said "display window" value, determining to not offer to make said requested delivery within said particular delivery time window.

55. The method of claim 54, wherein said step of combining said cost factor and said customer factor comprises adding said cost factor and said customer factor.

56. A method of determining whether to offer to make a requested delivery within a particular delivery time window, said method comprising the steps of:
    determining a cost factor associated with making said requested delivery within said particular delivery time window;
    determining a customer factor associated with a customer requesting said requested delivery;
    identifying a threshold "offer window" value;
    combining said cost factor and said customer factor to derive a combined delivery factor; and
    in response to said combined delivery factor being less than said "offer window" value, determining to offer to make said requested delivery within said particular delivery time window.

57. The method of claim 56, further including the step of, in response to said combined delivery factor being greater than said "offer window" value, determining to not offer to make said requested delivery within said particular delivery time window.

58. The method of claim 56, wherein said step of combining said cost factor and said customer factor comprises adding said cost factor and said customer factor.

59. A delivery feasibility analysis system, said system comprising:
    a central processing unit;
    a memory coupled to said central processing unit; and
    a display screen coupled to said central processing unit, said central processing unit being configured for:
        identifying a time window in which a delivery may be made to a customer;
        determining a cost of delivery, said cost of delivery comprising a cost of making said delivery to said customer within said time window;
        comparing said cost of delivery with a threshold cost; and
        responsive to said cost of delivery being less than said threshold cost, indicating that said time window is available for said delivery.

60. The system of claim 59, wherein said central processing unit is further configured for, responsive to said cost of delivery being less than said threshold cost, displaying said time window to said customer.

61. The system of claim 59, wherein said central processing unit is further configured for, responsive to said cost of delivery being equal to said threshold cost, indicating that said time window is not available for said delivery.

62. The system of claim 59, wherein said central processing unit is further configured for, responsive to said delivery cost being greater than said threshold cost, indicating that said time window is not available for said delivery.

63. The system of claim 59, wherein said central processing unit is further configured for, responsive to said delivery cost being greater than said threshold cost, withholding said time window from display to a customer.

64. The system of claim 63, wherein said central processing unit is further configured for receiving said threshold cost from a user.

65. The system of claim 63, wherein said time window is a first time window, said cost of delivery is a first cost of delivery, and said central processing unit is further configured for:
    identifying a second time window in which said delivery may be made to a customer;
    determining a second cost of delivery, said second cost of delivery comprising a cost of making said delivery to said customer within said second time window;
    comparing said second cost of delivery with said threshold cost; and
    responsive to said second cost of delivery being less than said threshold cost, displaying said second time window to said customer.

66. The system of claim 65, wherein said central processing unit is further configured for, in response to said second cost of delivery being equal to said threshold cost, withholding said second time window from display to said customer.

67. The system of claim 65, wherein said central processing unit is further configured for, in response to said second delivery cost being greater than said threshold cost, indicating that said second time window is not available for said delivery.

68. The system of claim 65, wherein said central processing unit is further configured for, in response to said second delivery cost being greater than said threshold cost, withholding said second time window from display to said customer.

69. The system of claim 59, wherein said cost of delivery comprises labor costs and transportation costs associated with said delivery.

70. The system of claim 69, wherein said cost of delivery further comprises vehicle preparation costs, and vehicle loading costs associated with said delivery.

71. The system of claim 59, wherein said time window is a first time window, said cost of delivery is a first cost of delivery, and said central processing unit is further configured for:
    identifying a second time window in which said delivery may be made to a customer;
    determining a second cost of delivery, said second cost of delivery comprising a cost of making said delivery to said customer within said second time window;
    comparing said second cost of delivery with said threshold cost; and
    responsive to said second cost of delivery being less than said threshold cost, indicating that said second time window is available for said delivery.

72. The system of claim 59, wherein said central processing unit is further configured for receiving said threshold cost from a user.

73. The system of claim 59, wherein said second cost of delivery comprises labor costs, transportation costs, vehicle preparation costs, and vehicle loading costs.

74. The system of claim 59, wherein said delivery is a requested delivery and said time window is associated with a delivery vehicle, said delivery vehicle being already scheduled to make at least one confirmed delivery within said time widow, and wherein said step of identifying said time window comprises the step of determining whether said delivery vehicle can make both said at least one confirmed delivery and said requested delivery within said time window.

75. The system of claim 59, wherein said delivery is a requested delivery and said time window is associated with a delivery vehicle, said delivery vehicle having a delivery capacity, and wherein said step of identifying said time window comprises the step of determining whether said delivery capacity of said delivery vehicle would be exceeded by said requested delivery.

76. The system of claim 59, wherein the step of displaying said time window to said customer comprises displaying said time window to said customer for a predetermined period of time, and further including the steps of:
   determining an updated cost of delivery, said updated cost of delivery comprising a cost of making said delivery to said customer within said time window;
   comparing said updated cost of delivery with said threshold cost; and
   in response to said updated cost of delivery being less than said threshold cost, displaying said time window to said customer.

77. The system of claim 76, wherein said central processing unit is further configured for, in response to said updated cost of delivery being equal to said threshold cost, withholding said time window from display to said customer.

78. The system of claim 76, wherein said central processing unit is further configured for, in response to said updated cost of delivery being greater than said threshold cost, withholding said time window from display to said customer.

79. The system of claim 59, wherein said threshold cost is defined to vary based upon the type of customer requesting said delivery.

* * * * *